US008335372B2

(12) United States Patent
Hasegawa

(10) Patent No.: US 8,335,372 B2
(45) Date of Patent: Dec. 18, 2012

(54) IMAGE ENLARGEMENT METHOD THAT USES INFORMATION ACQUIRED IN A PIXEL INTERPOLATION PROCESS

(75) Inventor: Hiromu Hasegawa, Osaka (JP)

(73) Assignee: MegaChips Corporation, Osaka-shi (JP)

( * ) Notice: Subject to any disclaimer, the term of this patent is extended or adjusted under 35 U.S.C. 154(b) by 575 days.

(21) Appl. No.: 12/578,927

(22) Filed: Oct. 14, 2009

(65) Prior Publication Data

US 2010/0104183 A1 Apr. 29, 2010

(30) Foreign Application Priority Data

Oct. 23, 2008 (JP) .................................. 2008-272927

(51) Int. Cl.
*G06K 9/40* (2006.01)
*G06K 9/32* (2006.01)
*G06K 9/64* (2006.01)
*G06K 9/00* (2006.01)
(52) U.S. Cl. ...................... 382/160; 382/260; 382/300
(58) Field of Classification Search .................. 382/162, 382/164, 165, 167, 252, 254, 260–264, 266, 382/272, 273, 278, 299, 300; 348/222.1, 348/223.1, 253, 272, 273, 280, 538, 699, 348/E05.091; 358/515, 518, 525
See application file for complete search history.

(56) References Cited

U.S. PATENT DOCUMENTS

| | | | | |
|---|---|---|---|---|
| 6,853,748 B2* | 2/2005 | Endo et al. | | 382/167 |
| 7,486,844 B2* | 2/2009 | Chang et al. | | 382/300 |
| 7,830,426 B2* | 11/2010 | Subbotin | | 348/272 |
| 7,911,515 B2* | 3/2011 | Ito et al. | | 348/262 |
| 7,995,868 B2* | 8/2011 | Hasegawa et al. | | 382/299 |
| 2006/0114526 A1* | 6/2006 | Hasegawa | | 358/518 |
| 2006/0262196 A1* | 11/2006 | Hasegawa et al. | | 348/223.1 |
| 2007/0126885 A1* | 6/2007 | Hasegawa | | 348/222.1 |
| 2009/0041371 A1* | 2/2009 | Hasegawa | | 382/261 |
| 2009/0060389 A1* | 3/2009 | Hasegawa et al. | | 382/300 |
| 2009/0136153 A1* | 5/2009 | Hasegawa | | 382/278 |
| 2010/0104183 A1* | 4/2010 | Hasegawa | | 382/167 |
| 2011/0043671 A1* | 2/2011 | Yamaguchi et al. | | 348/280 |

FOREIGN PATENT DOCUMENTS

| | | |
|---|---|---|
| JP | 2000-253238 A | 9/2000 |
| JP | 2004-253944 A | 9/2004 |
| JP | 2005-266918 A | 9/2005 |
| JP | 2006-186965 | 7/2006 |
| JP | 2007-286869 | 11/2007 |
| JP | 2007-293912 A | 11/2007 |

* cited by examiner

*Primary Examiner* — Amir Alavi
(74) *Attorney, Agent, or Firm* — Oblon, Spivak, McClelland, Maier & Neustadt, L.L.P.

(57) ABSTRACT

A correlation value calculation circuit calculates respective correlation values of each pixel for color image or for gray image in four directions. A selection circuit determines respective correlation values (Cv, Ch, $Cd_A$ and $Cd_B$) in the four directions on the basis of a chroma evaluation value. A first correlation judgment circuit determines a correlation direction of a specified pixel from the correlation values (Cv, Ch, $Cd_A$ and $Cd_B$). A first interpolation circuit performs color interpolation on the basis of the determined correlation direction. A color-interpolated image is enlarged by an enlargement circuit. A correlation direction interpolation circuit performs enlargement and interpolation of the correlation direction determined by the first correlation judgment circuit. A filter performs a filtering process for each of pixels of the enlarged image by using the interpolated correlation direction for enlargement.

8 Claims, 32 Drawing Sheets

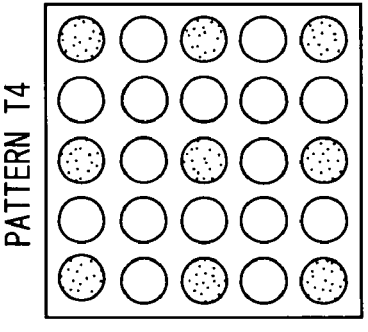
FIG. 23A PATTERN T1
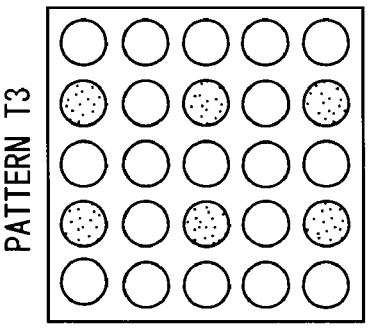
FIG. 23B PATTERN T2
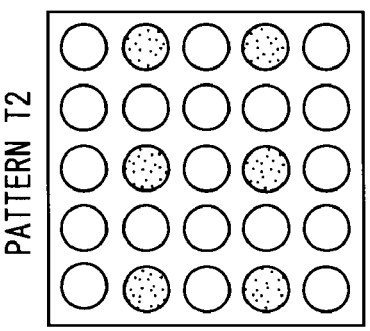
FIG. 23C PATTERN T3
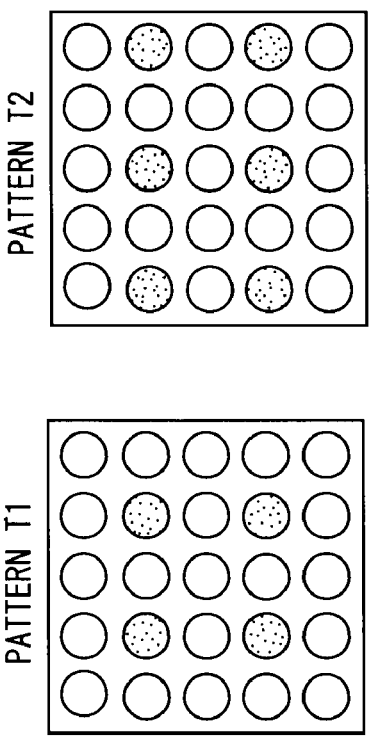
FIG. 23D PATTERN T4

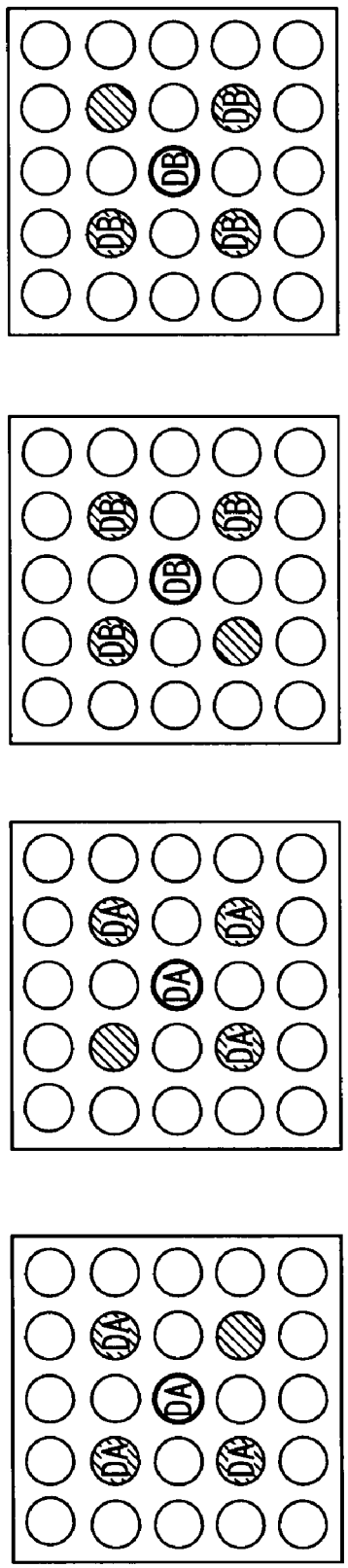

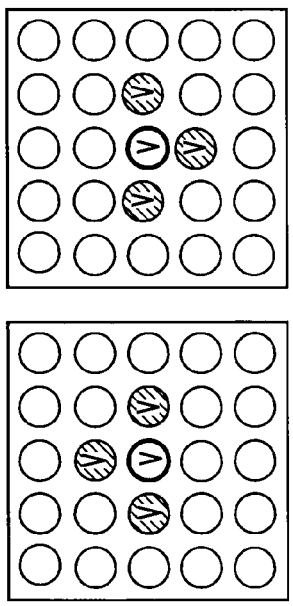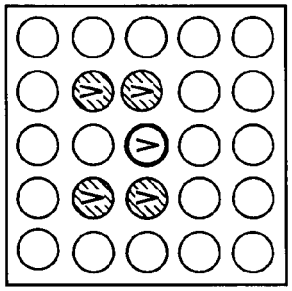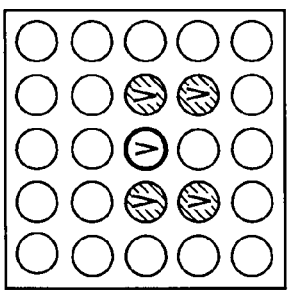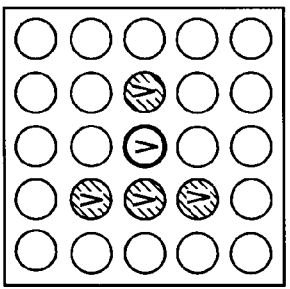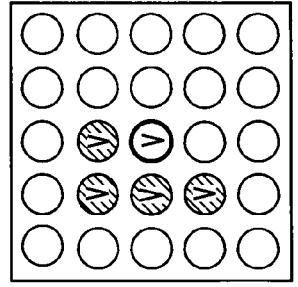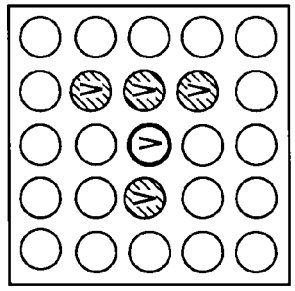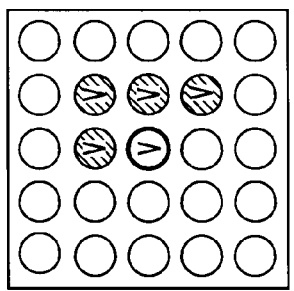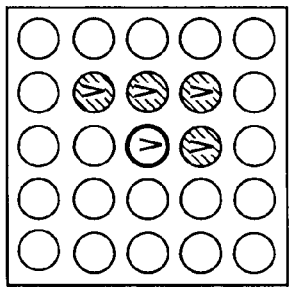

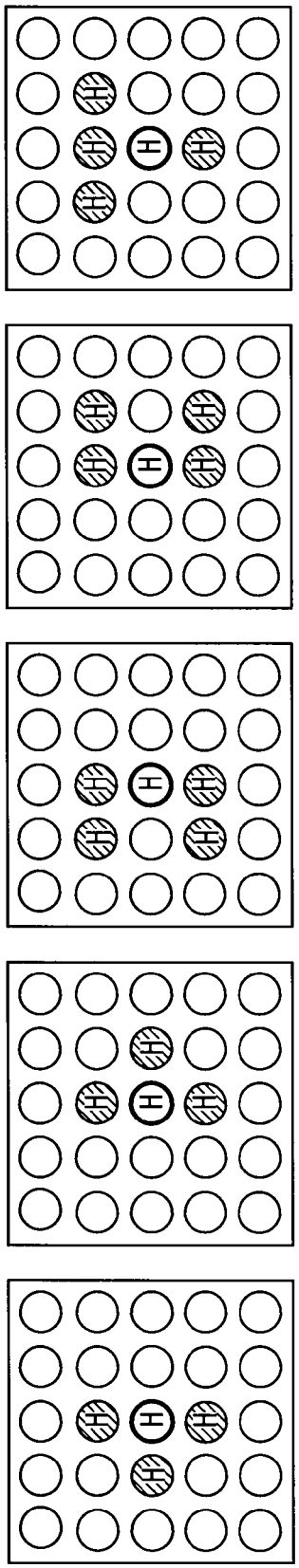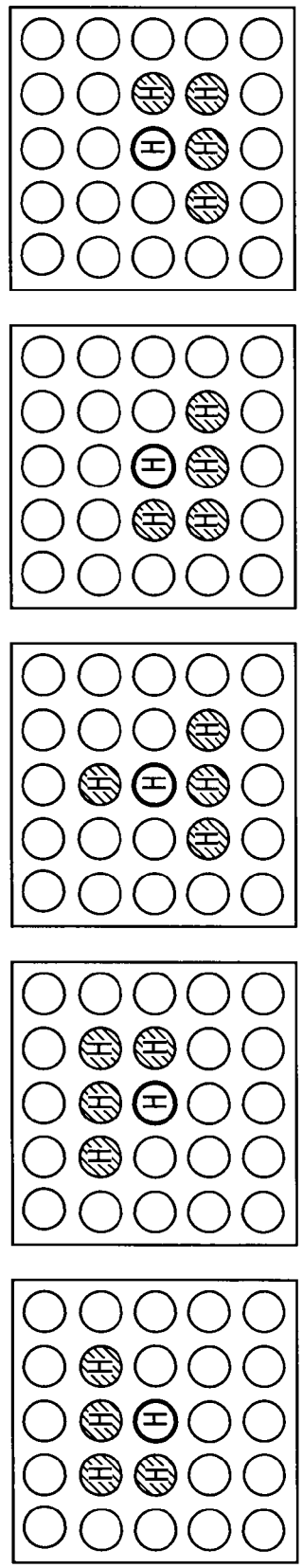

US 8,335,372 B2

IMAGE ENLARGEMENT METHOD THAT USES INFORMATION ACQUIRED IN A PIXEL INTERPOLATION PROCESS

BACKGROUND OF THE INVENTION

1. Field of the Invention

The present invention relates to a technique for image enlargement performed by an image processing circuit.

2. Description of the Background Art

Image pickup elements, such as CCDs, CMOSs and the like which are used in digital cameras and the like, perform photoelectric conversion of light received through color filters, to output pixel signals. Such color filters include RGB color filters, YMCK color filters and the like. From a single-chip image pickup element, a pixel signal for one color is outputted per pixel. For example, when the RGB color filter is used, a pixel signal for one of R (Red) component, G (Green) component and B (Blue) component is outputted for one pixel.

For this reason, as to the pixel signal outputted from the single-chip color image pickup element, interpolation of pixel signals for other color components has to be performed. Various algorithms are used to perform such interpolation, and one of these algorithms uses a correlation value. In this algorithm, the respective degrees of correlation in horizontal and vertical directions are calculated and pixel interpolation is performed by using pixels in the direction where the degree of correlation is higher. Also in Japanese Patent Application Laid Open Gazette No. 2006-186965, pixel interpolation is performed in consideration of the correlation direction.

An image processing circuit in a digital camera and the like also performs enlargement of an image. The image processing circuit enlarges the image by using bilinear interpolation and the like. Though various algorithms can be used to perform such enlargement, interpolation is certainly processing based on prediction. Therefore, it is necessary to perform a filtering process on the enlarged and interpolated image, in order to improve the quality of the image.

SUMMARY OF THE INVENTION

Though the image processing circuit performs various processes such as the above-discussed pixel interpolation, information acquired by these processes is used only in these processes themselves. If the information acquired in these processes can be used also in the filtering process after enlargement of the image, this is thought to be useful for improvement in the quality of the image.

The present invention is intended for an image enlargement method. According to the present invention, the image enlargement method comprises a) an input step of inputting a pixel signal of a predetermined color space, which has one color component per pixel, b) a correlation direction calculation step of obtaining a correlation direction of each pixel, c) a color component interpolation step of interpolating a signal of other color component in the predetermined color space for each pixel by using pixels relating to the correlation direction, d) an image enlargement step of generating an enlarged image by interpolating a pixel signal for enlargement, e) a correlation direction interpolation step of interpolating for enlargement the correlation direction on each pixel generated by interpolation by using the correlation direction obtained in the correlation direction calculation step b), and f) a filtering step of performing a filtering process on a pixel existing before execution of the image enlargement step d) in consideration of the correlation direction obtained in the correlation direction calculation step b) or on a pixel generated in the image enlargement step d) in consideration of the correlation direction interpolated in the correlation direction interpolation step e).

In the present invention, the filtering process is performed on the enlarged image by using the information on the correlation direction which is used for color interpolation of the image. It is thereby possible to improve the quality of the enlarged and interpolated image. A digital camera, for example, can enlarge a pickup image with its high quality maintained.

Therefore, it is an object of the present invention to effectively use, in an image enlargement process, the information acquired by other processings performed in the image processing circuit, to thereby improve the quality of an image.

These and other objects, features, aspects and advantages of the present invention will become more apparent from the following detailed description of the present invention when taken in conjunction with the accompanying drawings.

BRIEF DESCRIPTION OF THE DRAWINGS

FIGS. 23A to 23D are views showing four array patterns of the enlarged pixel signals;

FIGS. 26A to 26D are views each showing the method of interpolating a correlation direction in Step 1;

FIGS. 29A to 29J are views each showing the method of interpolating a correlation direction in Step 2;

FIGS. 30A to 30J are views each showing the method of interpolating a correlation direction in Step 2;

DESCRIPTION OF THE PREFERRED EMBODIMENTS

{The First Preferred Embodiment}

<1. Schematic Overall Structure of Digital Camera>

Figure 1:
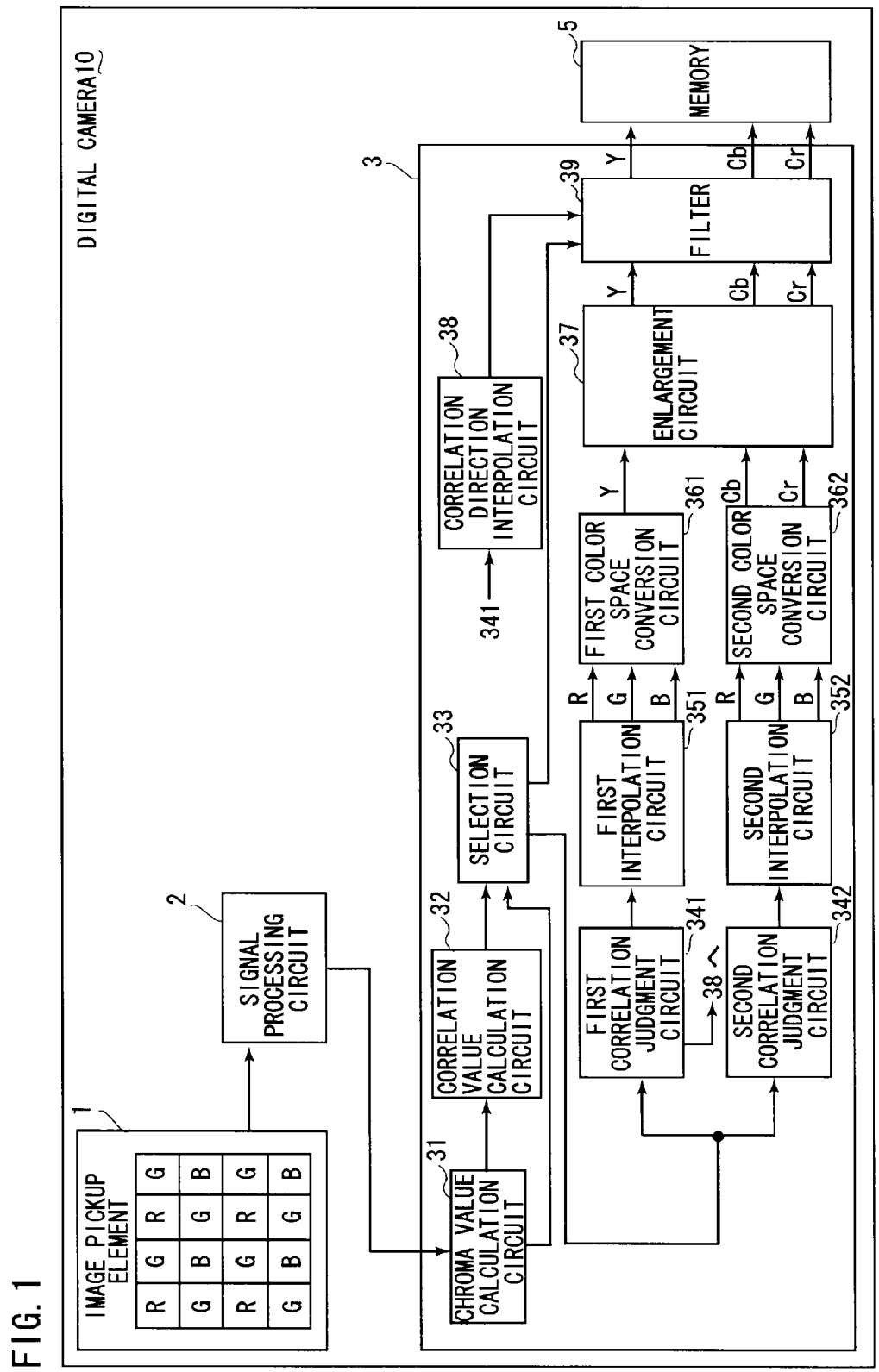
FIG. 1 is a block diagram showing a digital camera in accordance with preferred embodiments of the present invention.

FIG. 1 is a block diagram showing a digital camera 10 in accordance with the first preferred embodiment. The digital camera 10 comprises an image pickup element 1, a signal processing circuit 2, an image processing circuit 3 and a memory 5. The image pickup element 1 is a single-chip CCD comprising a color filter array of RGB Bayer array and outputs a pixel signal of any one of color components of R (Red), G (Green) and B (Blue) from one pixel. Specifically, for example, if G signals and R signals are alternately outputted, such as G→R→G→R . . . , in horizontal lines in odd rows, B signals and G signals are alternately outputted, such as B→G→B→G . . . , in horizontal lines in even rows. Further, as the image pickup element 1, a CMOS sensor may be used.

The pixel signal outputted from the image pickup element 1 is inputted to the signal processing circuit 2. In the signal processing circuit 2, a signal processing such as white balancing, black level correction or the like is performed on the pixel signal. The pixel signal outputted from the signal processing circuit 2 is inputted to the image processing circuit 3. The image processing circuit 3 comprises a chroma value calculation circuit 31, a correlation value calculation circuit 32, a selection circuit 33, first and second correlation judgment circuits 341 and 342, first and second interpolation circuits 351 and 352 and first and second color space conversion circuits 361 and 362. Further, the image processing circuit 3 comprises an enlargement circuit 37, a correlation direction interpolation circuit 38 and a filter 39.

The chroma value calculation circuit 31 calculates a chroma value of an area by using pixel signals of a specified pixel and its surrounding pixels. This chroma value serves as an indicator for judgment on whether the area is a gray image or a color image.

The correlation value calculation circuit 32 calculates a correlation value of an area by using the pixel signals of the specified pixel and its surrounding pixels.

The selection circuit 33 selects whether an operation for gray image or an operation for color image is to be performed in a correlation judgment process and a pixel interpolation process, on the basis of the chroma value calculated by the chroma value calculation circuit 31.

The first correlation judgment circuit 341 and the second correlation judgment circuit 342 each judge a correlation direction by using the correlation value which is calculated by the correlation value calculation circuit 32 and selected by the selection circuit 33.

The first interpolation circuit 351 performs the pixel interpolation process on the specified pixel on the basis of the judgment result of the first correlation judgment circuit 341, and the second interpolation circuit 352 performs the pixel interpolation process on the specified pixel on the basis of the judgment result of the second correlation judgment circuit 342.

The first color space conversion circuit 361 performs color space conversion of the pixel signal of RGB interpolated by the first interpolation circuit 351, to generate a Y signal (luminance signal). The second color space conversion circuit 362 performs color space conversion of the pixel signal of RGB interpolated by the second interpolation circuit 352, to generate a Cb signal and a Cr signal (color difference signals).

Further, the chroma value calculation circuit 31, the correlation value calculation circuit 32, the first and second interpolation circuits 351 and 352, the correlation direction interpolation circuit 38 and the filter 39 each comprise a group of registers for accumulating pixel signals in a matrix area of M×N in order to perform computation using the pixel signals of the specified pixel and its surrounding pixels. Furthermore, these circuits 31, 32, 351, 352, 38 and 39 may share the registers.

After the pixel interpolation process is performed in the first and second interpolation circuits 351 and 352, each pixel becomes a signal having all the color components of RGB and is converted into a YCbCr signal by the first and second color space conversion circuits 361 and 362. Then, this pixel signal is enlarged by the enlargement circuit 37.

For example, an image enlarged twice in each of the horizontal and vertical directions in the enlargement circuit 37 is subjected to a filtering process in the filter 39. The correlation direction interpolation circuit 38 interpolates the correlation direction on each of the interpolated pixel signals for enlargement. The filter 39 performs an edge enhancement process or a noise removal process on each pixel signal by using the correlation direction interpolated by the correlation direction interpolation circuit 38. After the filtering process, the pixel signal is stored into the memory 5.

<2. Representation of Pixels in Bayer Array>

Figure 2A:
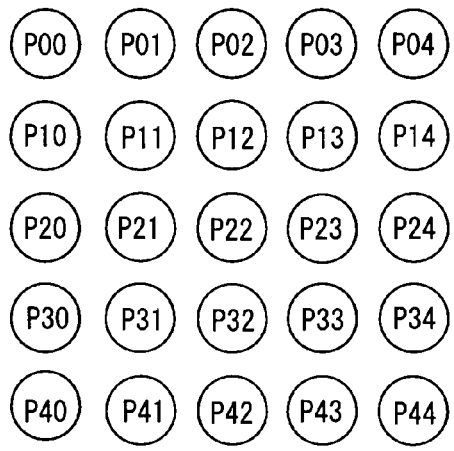
FIGS. 2A to 2E are views each showing an array pattern of pixels in an RGB Bayer array.

Next, discussion will be made on representation of pixels in Bayer array used in the following description and figures. Pixels in a matrix area of 5×5 are represented in FIG. 2A. In FIG. 2A, reference sign P represents a pixel without consideration of color components of RGB. In contrast to this, in FIGS. 2B to 2E, pixels are represented with distinction of color components. Reference signs R, G and B represent a red pixel, a green pixel and a blue pixel, respectively. Further, in FIGS. 2A-2E and 5A-5B to 12A-12C, G pixels are represented by solid-line circles and R and B pixels are represented by broken-line circles.

Among two numbers following the reference signs P, R, G and B, the first number represents the row number of a pixel in the matrix area and the second number represents the column number of the pixel in the matrix area. FIGS. 2A to 2E each represent a pixel array of the matrix area consisting of 25 pixels, P00 to P44, including a specified pixel P22. The same representation is applied to other figures. Further, in descriptions of the preferred embodiments and equations, the reference signs P, R, G and B sometimes represent pixel values. The reference sign P11, for example, represents a pixel at the first row and the first column and also represents the pixel value of the pixel at the first row and the first column.

Figure 2B:
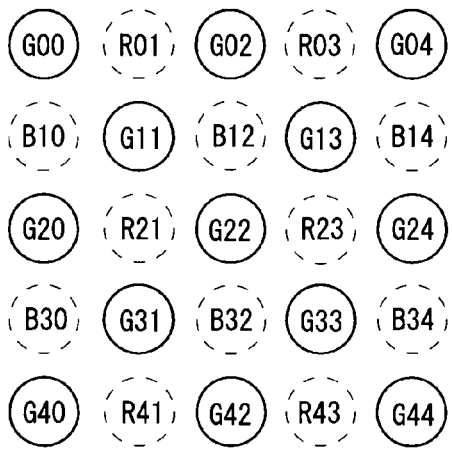
Figure 2C:
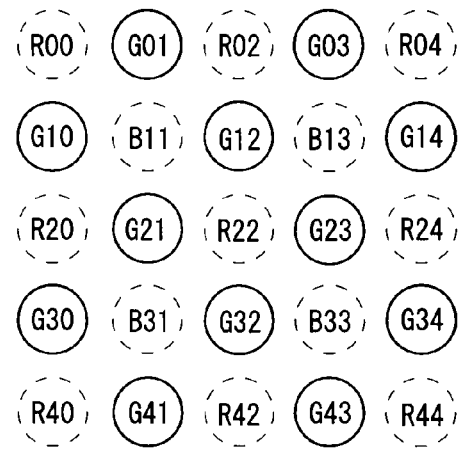
Figure 2D:
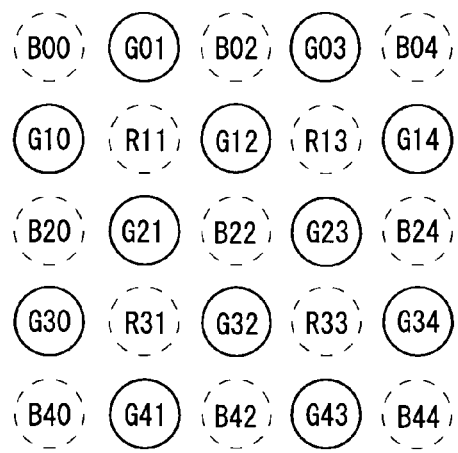
Figure 2E:
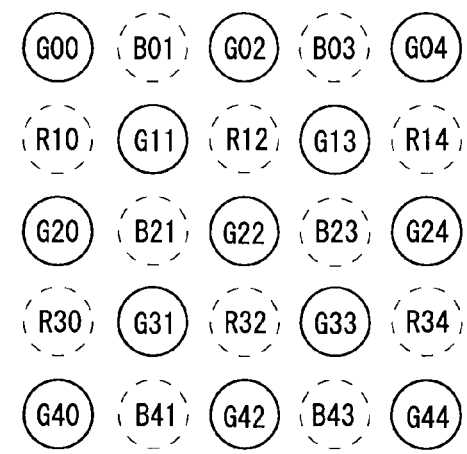

FIGS. 2B and 2E represent pixel arrays in a case where the specified pixel P22 is a G pixel. FIG. 2C represents a pixel array in a case where the specified pixel P22 is an R pixel. FIG. 2D represents a pixel array in a case where the specified pixel P22 is a B pixel. As discussed above, in the chroma value calculation circuit 31, the correlation value calculation circuit 32 and the first and second interpolation circuits 351 and 352, the pixel signals in the matrix area are accumulated in the group of registers in order to perform computation using the pixel signals of the specified pixel and its surrounding pixels. In a case where pixels in a matrix area of 5×5 are to be processed, there are four patterns of pixel signals stored in the group of registers as shown in FIGS. 2B to 2E. Further, in a case where pixels in a matrix area of 3×3 are to be processed, nine pixels P11, P12, P13, P21, P22, P23, P31, P32 and P33, with the specified pixel P22 centered among these pixels, are used and there are also four patterns of pixel signals as shown in FIGS. 2B to 2E.

<3. Chroma Value Calculation Process>

Next, detailed discussion will be made on a chroma value calculation process performed by the chroma value calculation circuit 31. The chroma value calculation circuit 31 analyzes a color difference component in a matrix area (consisting of a specified pixel and its surrounding pixels) including a specified pixel and calculates a chroma evaluation value of this area. This chroma evaluation value is used later in a selection step to judge whether an area to be processed is an image with high chroma (hereinafter, referred to as color image) or an image with low chroma (hereinafter, referred to as gray image).

The chroma evaluation value is calculated in the matrix area including the specified pixel on the basis of a color difference component between the level of G pixel and the level of R pixel and a color difference component between the level of G pixel and the level of B pixel. In the first preferred embodiment, two color difference component evaluation values are calculated in order to determine the chroma evaluation value. The chroma value calculation circuit 31 calculates a "first color difference component evaluation value" and a "second color difference component evaluation value". The "first color difference component evaluation value" refers to an evaluation value obtained from a color difference component value on the basis of average pixel values. The color difference component value on the basis of average pixel values refers to a color difference component value obtained from the respective average pixel values for color components of the pixels existing in this area without consideration of the respective positions of the pixels in the matrix area. The "second color difference component evaluation value" refers to an evaluation value obtained by accumulating the color difference component values in a specific direction, in consideration of the respective positions of the pixels in the matrix area.

Thus, the reason why two kinds of color difference component evaluation values are calculated is as follows. In a gray image in which fine lines are present in a horizontal or vertical direction, such as retoma chart, if the above "first color difference component evaluation value" is adopted as the chroma value, there is a possibility that the gray image may be wrongly judged as a color image. The reason of this phenomenon is that even though there is a strong correlation in the horizontal or vertical direction, the color difference component is calculated by using the average pixel values in this area without consideration of this correlation. Then, in the first preferred embodiment, as discussed below, two kinds of color difference component evaluation values are calculated and the lower one in level of color difference component is adopted as the chroma value.

(3-1) The First Color Difference Component Evaluation Value

First, discussion will be made on a method of calculating the first color difference component evaluation value. The first color difference component evaluation value is suitable for evaluation of color difference components of flat parts (low-frequency areas) such as blue sky, wallpaper without any pattern, or the like. Herein, the flat part refers to an area having no strong correlation in a specific direction. In order to calculate the first color difference component evaluation value, first, respective average values $R_{ave}$, $G_{ave}$ and $B_{ave}$ of the pixel values for R, G and B included in a matrix area of 3×3 with a specified pixel centered are calculated. The average values $R_{ave}$, $G_{ave}$ and $B_{ave}$ are generally expressed as Eq. 1. In Eq. 1, $N_R$, $N_G$ and $N_B$ represent the numbers of pixels of R, G and B, respectively, existing in this matrix area and the terms of Σ represent respective cumulative pixel values for the three color components.

$$R_{ave} = \frac{1}{N_R}\sum_i^{N_R} R_i \quad \text{(Eq. 1)}$$

$$G_{ave} = \frac{1}{N_G}\sum_i^{N_G} G_i$$

$$B_{ave} = \frac{1}{N_B}\sum_i^{N_B} B_i$$

As shown in FIGS. 2B to 2E, however, since there are four patterns of pixel arrays, the method of calculating the average value is different from pattern to pattern. First, in a case where the center pixel is a G pixel and the pattern corresponds to the pixel array of FIG. 2B, the average values $R_{ave}$, $G_{ave}$ and $B_{ave}$ are calculated from Eq. 2.

$$G_{ave} = \frac{G11 + G13 + G22 + G31 + G33}{5} \quad \text{(Eq. 2)}$$

$$R_{ave} = \frac{R21 + R23}{2}$$

$$B_{ave} = \frac{B12 + B32}{2}$$

In a case where the center pixel is an R pixel and the pattern corresponds to the pixel array of FIG. 2C, the average values $R_{ave}$, $G_{ave}$ and $B_{ave}$ are calculated from Eq. 3.

$$G_{ave} = \frac{G12 + G21 + G23 + G32}{4} \quad \text{(Eq. 3)}$$

$$R_{ave} = R22$$

$$B_{ave} = \frac{B11 + B13 + B31 + B33}{4}$$

In a case where the center pixel is a B pixel and the pattern corresponds to the pixel array of FIG. 2D, the average values $R_{ave}$, $G_{ave}$ and $B_{ave}$ are calculated from Eq. 4.

$$G_{ave} = \frac{G12 + G21 + G23 + G32}{4} \quad \text{(Eq. 4)}$$

$$R_{ave} = \frac{R11 + R13 + R31 + R33}{4}$$

$$B_{ave} = B22$$

In a case where the center pixel is a G pixel and the pattern corresponds to the pixel array of FIG. 2E, the average values $R_{ave}$, $G_{ave}$ and $B_{ave}$ are calculated from Eq. 5.

$$G_{ave} = \frac{G11 + G13 + G22 + G31 + G33}{5} \quad \text{(Eq. 5)}$$

$$R_{ave} = \frac{R12 + R32}{2}$$

$$B_{ave} = \frac{B21 + B23}{2}$$

The chroma value calculation circuit 31 performs computation in accordance with any one of Eqs. 2 to 5 depending on which one of the patterns shown in FIGS. 2B to 2E the pixel array of the matrix area is, to calculate the average values $R_{ave}$, $G_{ave}$ and $B_{ave}$. The chroma value calculation circuit 31 further performs computation expressed by Eq. 6 by using the calculated average values $R_{ave}$, $G_{ave}$ and $B_{ave}$, to calculate the first color difference component evaluation value $L_{global}$. In other words, the color difference component evaluation value $L_{global}$ is an evaluation value of color difference component, which is calculated by using the color difference component value on the basis of the respective average pixel values for the color components existing in the matrix area.

$$L_{global} = \frac{|G_{ave} - R_{ave}| + |G_{ave} - B_{ave}|}{2} \quad \text{(Eq. 6)}$$

(3-2) The Second Color Difference Component Evaluation Value

Next, discussion will be made on a method of calculating the second color difference component evaluation value. The second color difference component evaluation value is suitable for evaluation of color difference components in an area where there is a strong correlation in a matrix area and the chroma value may largely vary depending on the method of calculating the color difference component value. As discussed above, for example, if the first color difference component evaluation value obtained in (3-1) is adopted as the chroma evaluation value in a gray image including a high-frequency component, such as a retoma chart or the like, there is a possibility that the gray image may be wrongly judged as a color image. Then, in order to appropriately obtain the color difference component evaluation value for such an image having a strong correlation in a specific direction, the following operation is performed.

The chroma value calculation circuit 31 performs computation expressed by Eqs. 7 and 8 by using pixel signals in a matrix area of 3×3. Specifically, in Eq. 7, the color difference component values are accumulated in the vertical direction, to calculate the color difference component evaluation value $L_{vertical}$ in the vertical direction. Further, in Eq. 8, the color difference component values are accumulated in the horizontal direction, to calculate the color difference component evaluation value $L_{horizontal}$ in the horizontal direction. In other words, in the computations of Eqs. 7 and 8, the color difference component values of the G pixels and the R pixels and the color difference component values of the G pixels and the B pixels are accumulated in the vertical direction and the horizontal direction, respectively. Both the color difference component evaluation values $L_{vertical}$ and $L_{horizontal}$ are the above-discussed second color difference component evaluation values.

$$L_{vertical} = \frac{|P11 - P21| + |P21 - P31| + 2|P12 - P22| + 2|P22 - P32| + |P13 - P23| + |P23 - P33|}{8} \quad \text{(Eq. 7)}$$

$$L_{horizontal} = \frac{|P11 - P12| + |P12 - P13| + 2|P21 - P22| + 2|P22 - P23| + |P31 - P32| + |P32 - P33|}{8} \quad \text{(Eq. 8)}$$

Further, in Eqs. 7 and 8, there are terms multiplied by a coefficient of "2". This is for coincidence between the color difference component cumulative number of the G and R pixels and that of the G and B pixels. Though the coefficient of "2" is used as a multiplier for coincidence between the cumulative numbers of different color difference components in the first preferred embodiment, however, the value of this coefficient may be set as appropriate.

Further, though the color difference component evaluation values in the vertical and horizontal directions are calculated in the first preferred embodiment, color difference component evaluation values in diagonal directions may be additionally calculated as objects of evaluation. For example, a color difference component evaluation value $Ld_A$ of a diagonal A direction which has the inclination of 45 degrees clockwisely from the horizontal direction with respect to the specified pixel P22 and a color difference component evaluation value $Ld_B$ of a diagonal B direction orthogonal to the diagonal A direction can be obtained from Eqs. 9 and 10. Eq. 9 is an equation, however, which is used in the case where the specified pixel P22 is a G pixel and Eq. 10 is an equation which is used in the case where the specified pixel P22 is an R pixel or a B pixel.

$$Ld_A = \left( \left| \frac{P13 + P22}{2} - P12 \right| + \left| \frac{P13 + P22}{2} - P23 \right| + \right.$$
$$\left. \left| \frac{P31 + P22}{2} - P21 \right| + \left| \frac{P31 + P22}{2} - P32 \right| \right) \times \frac{1}{4} \quad \text{(Eq. 9)}$$

$$Ld_B = \left( \left| \frac{P11 + P22}{2} - P12 \right| + \left| \frac{P11 + P22}{2} - P21 \right| + \right.$$
$$\left. \left| \frac{P33 + P22}{2} - P23 \right| + \left| \frac{P33 + P22}{2} - P32 \right| \right) \times \frac{1}{4}$$

$$Ld_A = \left( \left| \frac{P12 + P21}{2} - P11 \right| + \left| \frac{P12 + P21}{2} - P22 \right| + \right.$$
$$\left. \left| \frac{P23 + P32}{2} - P22 \right| + \left| \frac{P23 + P32}{2} - P33 \right| \right) \times \frac{1}{4} \quad \text{(Eq. 10)}$$

$$Ld_B = \left( \left| \frac{P12 + P23}{2} - P13 \right| + \left| \frac{P12 + P23}{2} - P22 \right| + \right.$$
$$\left. \left| \frac{P21 + P32}{2} - P22 \right| + \left| \frac{P21 + P32}{2} - P31 \right| \right) \times \frac{1}{4}$$

(3-3) Calculation of Chroma Factor

After calculating the three color difference component evaluation values $L_{global}$, $L_{vertical}$ and $L_{horizontal}$ by using the calculation methods as shown above in (3-1) and (3-2), the chroma value calculation circuit 31 further performs computation expressed by Eq. 11, to calculate a minimum value of the color difference component evaluation values $L_{global}$, $L_{vertical}$ and $L_{horizontal}$ (in other words, the smallest one in level of the color difference component). This minimum value is adopted as a chroma evaluation value L of the matrix area to be processed. In other words, the chroma evaluation value L is a chroma value determined in accordance with the specified pixel. In Eq. 11, min (x, y, z) represents the minimum value of x, y and z. Further, as discussed above, the color difference component evaluation values in the diagonal directions may be calculated as the second color difference component evaluation values, besides $L_{vertical}$ and $L_{horizontal}$, and in such a case, the minimum value has to be selected among the evaluation values including the color difference component evaluation values in the diagonal directions.

$$L = \min(L_{global}, L_{horizontal}, L_{vertical}) \quad \text{(Eq.11)}$$

Figure 3:
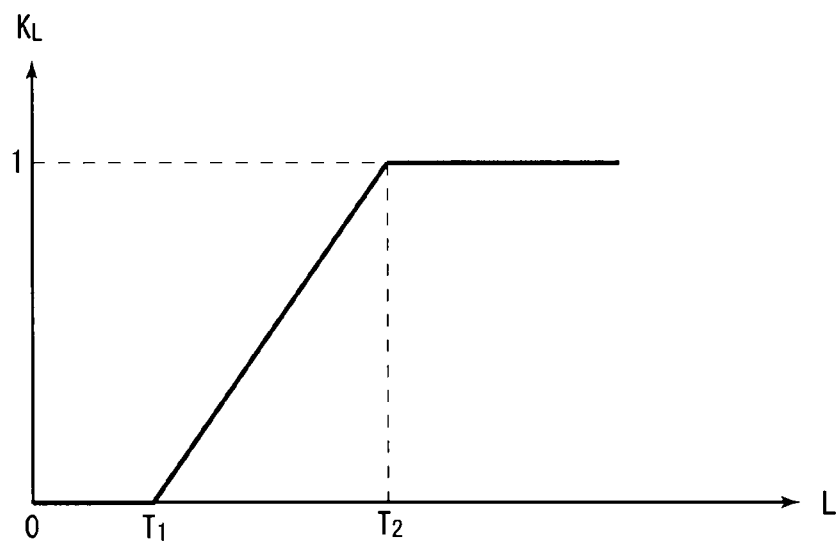
FIG. 3 is a graph showing a relation between a chroma value and a chroma factor.

After performing the above computations to obtain the chroma evaluation value L with respect to the specified pixel, the chroma value calculation circuit 31 next normalizes the chroma evaluation value L to calculate a chroma factor $K_L$. Specifically, the chroma value calculation circuit 31 performs normalization as expressed by Eq. 12 by using two threshold values $T_1$ and $T_2$. FIG. 3 is a graph showing a relation between the chroma evaluation value L and the chroma factor $K_L$. As shown in FIG. 3, the chroma factor $K_L$ for judgment on whether a gray image or a color image gently changes between the threshold values $T_1$ and $T_2$ which are set near the area where there is a change from a gray image to a color image, to ease a sharp change of image judgment.

When $L \leq T_1$ $K_L = 0$ (Eq. 12)

When $T_1 < L < T_2$ $K_L = \frac{L - T_1}{T_2 - T_1}$

When $T_2 \leq L$ $K_L = 1$

Further, since the two threshold values $T_1$ and $T_2$ are set near the boundary between the gray image and the color image, these values have only to be determined optimally on the basis of experimental results or experience but preferably should be variable parameters depending on characteristics of an input image. The characteristics of an input image are determined on the basis of photographing conditions such as the exposure time, the f number and the like. Further, as the characteristics of an input image, the characteristics of a CCD, optical characteristics of a lens and the like may be taken into account. The chroma factor $K_L$ which is calculated thus is used later in the selection step.

<4. Correlation Value Calculation Process>

Figure 4:
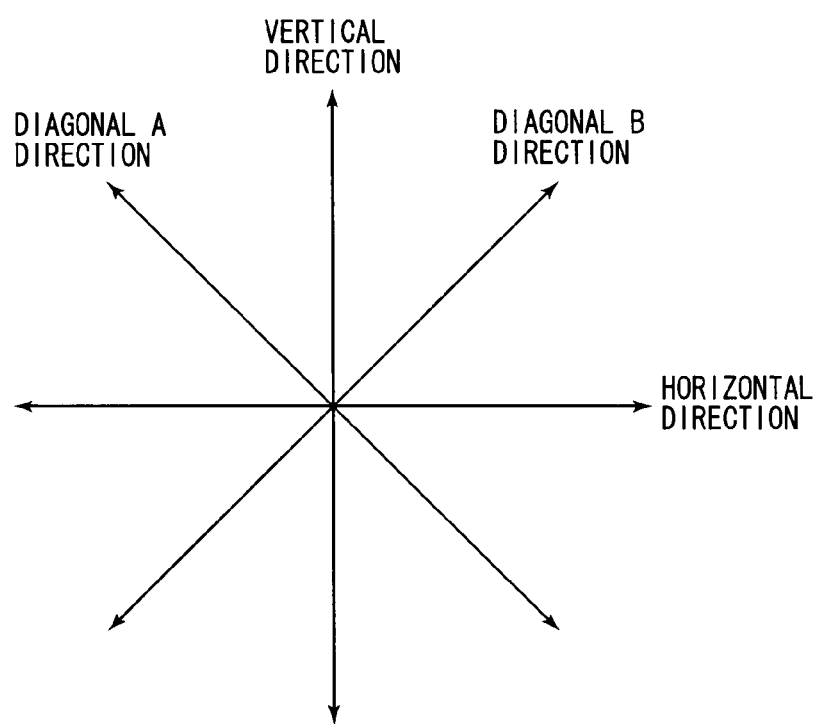
FIG. 4 is a view showing four correlation directions.

The correlation value calculation circuit 32 calculates correlation values in four directions in the matrix area by using the pixel signals of the specified pixel and its surrounding pixels. Herein, as shown in FIG. 4, the correlation values are calculated in the horizontal direction, the vertical direction, the diagonal A direction having the inclination of 45 degrees clockwisely with respect to the horizontal direction and the diagonal B direction orthogonal to the diagonal A direction. Specifically, a pixel differential value which is a difference between a value of the specified pixel and that of a pixel existing in each of these four directions is calculated and the pixel differential values in each direction are accumulated, to obtain the correlation value.

Further, in the first preferred embodiment, the correlation value calculation circuit 32 calculates both a correlation value for color image having high chroma and a correlation value for gray image having low chroma with respect to each matrix area. Then, finally in the later selection step, either of the correlation value for color image and that for gray image is selected, and then a correlation direction is determined.

Alternatively, a correlation value selected by overall judgment on both the correlation values for color image and the gray image is used to determine the correlation direction.

Figure 5A:
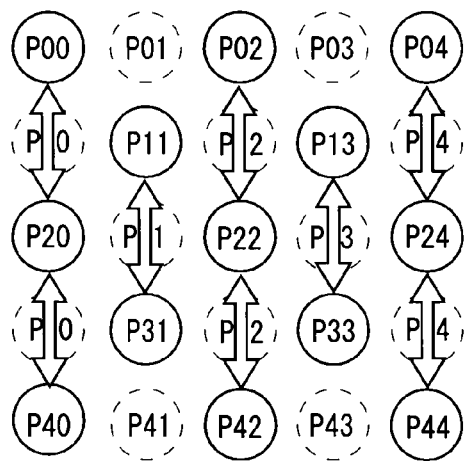
FIGS. 5A and 5B are views each showing a correlation value calculation method in a vertical direction in a color area where a specified pixel is a G pixel.
Figure 5B:
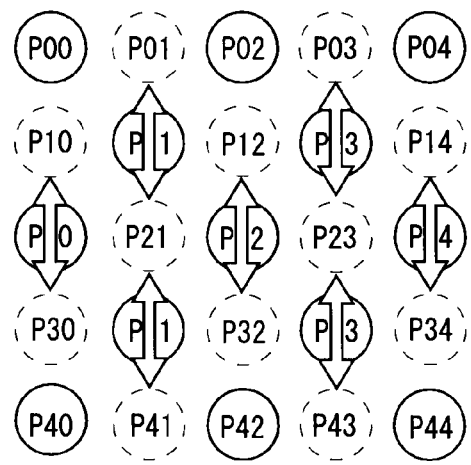
Figure 16:
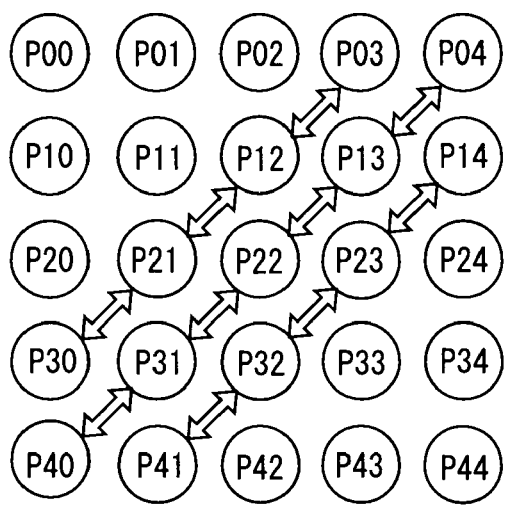
FIG. 16 is a view showing a correlation value calculation method in the diagonal B direction in the gray area.

(4-1) Correlation Value for Color Image Having High Chroma (4-1-1) When Center Pixel Is G First, discussion will be made on a correlation value calculation method for color image in a case where the specified pixel is a G pixel. In other words, this is a correlation value calculation method in a case where the matrix area has such a pixel array as shown in FIG. 2B or 2E. A correlation value in the vertical direction is calculated from Eq. 13. FIGS. 5A and 5B are views each showing a correlation value calculation method in the vertical direction, and FIG. 5A shows a correlation value calculation method on G pixels and FIG. 5B shows a correlation value calculation method on R pixels and B pixels. Thus, the correlation value for color image takes pixel differential values of all the color components into account. In FIGS. 5A-5B to 16, two pixels connected with an arrow are objects for calculation of the pixel differential value.

$$\text{Cv\_c} = \quad \text{(Eq. 13)}$$
$$(|P02 - P22| + |P22 - P42| + |P11 - P31| + |P13 - P33| +$$

-continued
$$|P00 - P20| + |P20 - P40| + |P04 - P24| + |P24 - P44| +$$
$$|P12 - P32| + |P10 - P30| + |P14 - P34| + |P01 - P21| +$$
$$|P21 - P41| + |P03 - P23| + |P23 - P43|) \times \frac{1}{15}$$

Figure 6A:
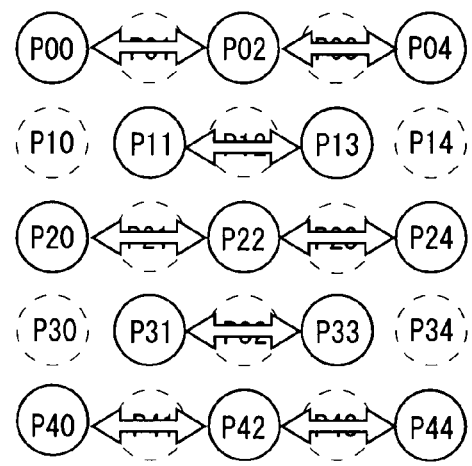
FIGS. 6A and 6B are views each showing a correlation value calculation method in a horizontal direction in the color area where the specified pixel is a G pixel.
Figure 6B:
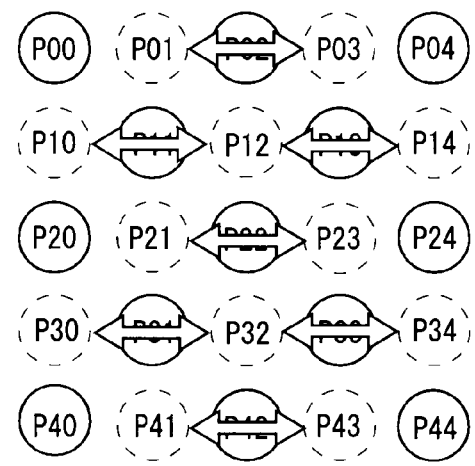

A correlation value in the horizontal direction is calculated from Eq. 14. FIGS. 6A and 6B are views each showing a correlation value calculation method in the horizontal direction, and FIG. 6A shows a correlation value calculation method on G pixels and FIG. 6B shows a correlation value calculation method on R pixels and B pixels.

$$Ch\_c = \quad (Eq. 14)$$
$$(|P20 - P22| + |P22 - P24| + |P11 - P13| + |P31 - P33| +$$
$$|P00 - P02| + |P02 - P04| + |P40 - P42| + |P42 - P44| +$$
$$|P21 - P23| + |P01 - P03| + |P41 - P43| + |P10 - P12| +$$
$$|P12 - P14| + |P30 - P32| + |P32 - P34|) \times \frac{1}{15}$$

Figure 7A:
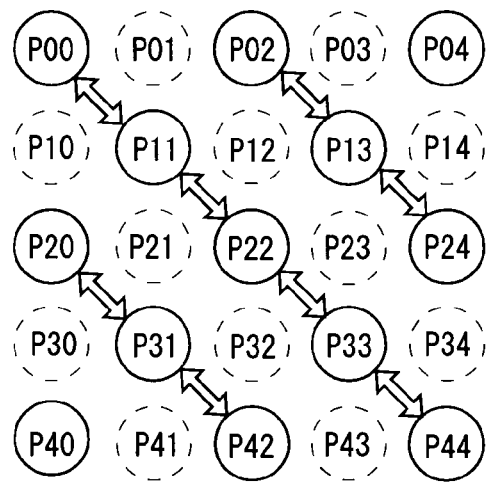
FIGS. 7A to 7C are views each showing a correlation value calculation method in a diagonal A direction in the color area where the specified pixel is a G pixel.
Figure 7B:
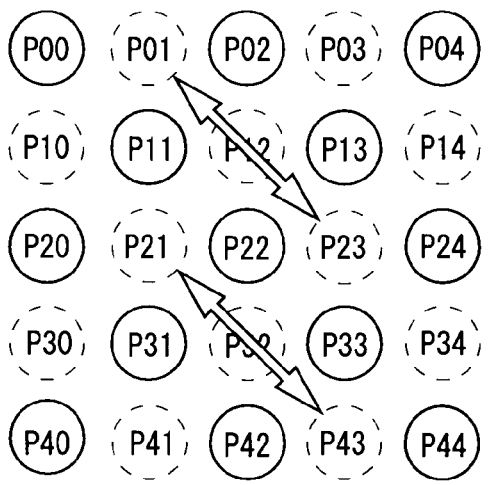
Figure 7C:
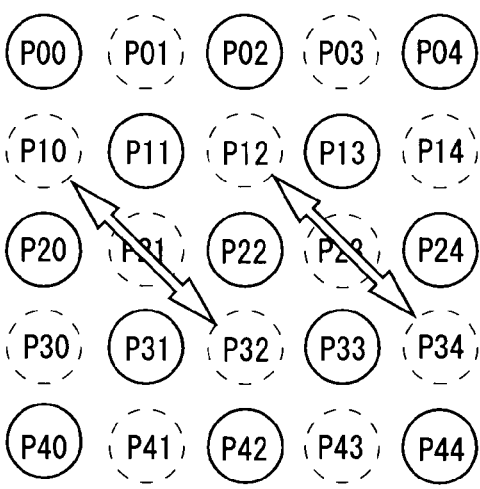

A correlation value in the diagonal A direction is calculated from Eq. 15. FIGS. 7A to 7C are views each showing a correlation value calculation method in the diagonal A direction, and FIG. 7A shows a correlation value calculation method on G pixels and FIGS. 7B and 7C show correlation value calculation methods on R pixels and B pixels, respectively.

$$Cd_{A\_}c = (|P11 - P22| \times 2 + |P22 - P33| \times 2 + |P02 - P13| \times 2 + \quad (Eq. 15)$$
$$|P13 - P24| \times 2 + |P20 - P31| \times 2 + |P31 - P42| \times 2 +$$
$$|P00 - P11| \times 2 + |P33 - P44| \times 2 + |P01 - P23| +$$
$$|P21 - P43| + |P12 - P34| + |P10 - P32|) \times \frac{1}{12}$$

As shown in FIGS. 7A to 7C, between the case of calculation on G pixels and the case of calculation on R pixels or B pixels, there is a difference in the distance between pixels on which the differential value is calculated. Then, in Eq. 15, the differential value on two G pixels with short distance is multiplied by 2. The reason is that the distance between two G pixels which are objects for calculation is half the distance between two R pixels or two B pixels which are objects for calculation and the pixel differential value responds to the amount of variation on G pixels that is twice as large as that on R pixels or B pixels. The multiplier of 2, however, is an example and may be selected as appropriate.

Figure 8A:
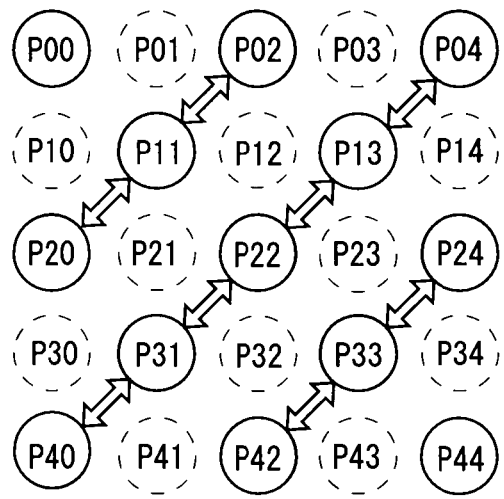
FIGS. 8A to 8C are views each showing a correlation value calculation method in a diagonal B direction in the color area where the specified pixel is a G pixel.
Figure 8B:
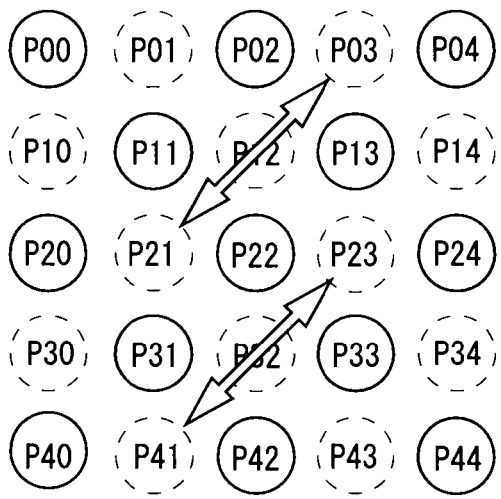
Figure 8C:
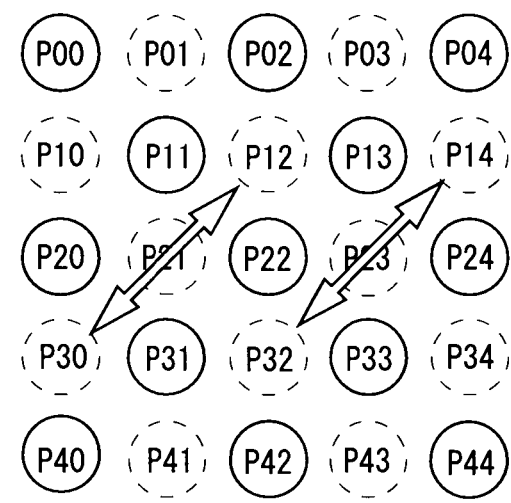

A correlation value in the diagonal B direction is calculated from Eq. 16. FIGS. 8A to 8C are views each showing a correlation value calculation method in the diagonal B direction, and FIG. 8A shows a correlation value calculation method on G pixels and FIGS. 8B and 8C show correlation value calculation methods on R pixels and B pixels, respectively.

$$Cd_{B\_}c = (|P13 - P22| \times 2 + |P22 - P31| \times 2 + |P02 - P11| \times 2 + \quad (Eq. 16)$$
$$|P11 - P20| \times 2 + |P24 - P33| \times 2 + |P33 - P42| \times 2 +$$

-continued
$$|P04 - P13| \times 2 + |P31 - P40| \times 2 + |P03 - P21| +$$
$$|P23 - P41| + |P12 - P30| + |P14 - P32|) \times \frac{1}{12}$$

Also in Eq. 16, like in Eq. 15, the differential value on two G pixels is multiplied by 2. Further, though the distance between pixels in FIGS. 7B, 7C, 8B and 8C is different from that in FIGS. 5A, 5B, 6A and 6B, herein the distance is regarded as equal, as the distance between two pixels with one pixel interposed therebetween. The differential value may be multiplied by a coefficient, however, taking the distance between these pixels into account.

(4-1-2) When Center Pixel Is B or R

Figure 9A:
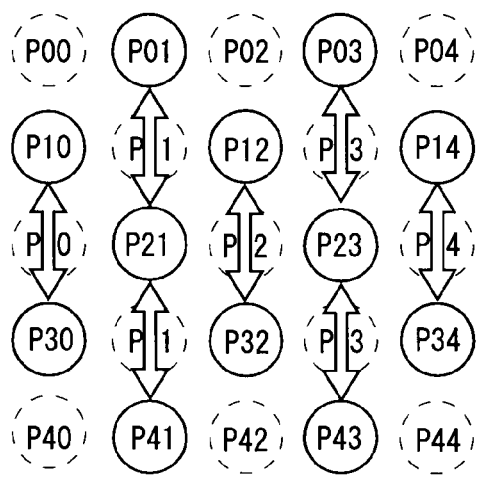
FIGS. 9A and 9B are views each showing a correlation value calculation method in the vertical direction in a color area where the specified pixel is an R pixel or a B pixel.
Figure 9B:
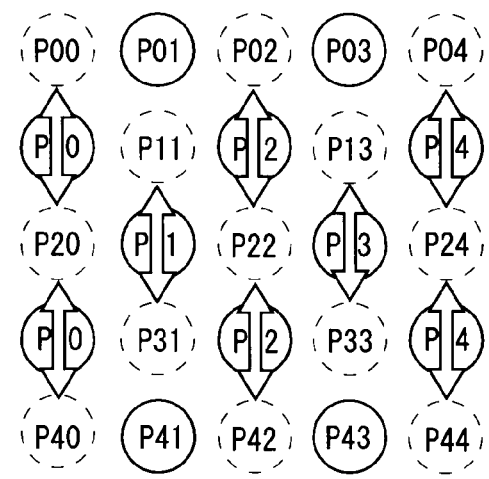

Next, discussion will be made on a correlation value calculation method for color image in a case where the specified pixel is a B or R pixel. In other words, this is a correlation value calculation method in a case where the matrix area has such a pixel array as shown in FIG. 2C or 2D. A correlation value in the vertical direction is calculated from Eq. 17. FIGS. 9A and 9B are views each showing a correlation value calculation method in the vertical direction, and FIG. 9A shows a correlation value calculation method on G pixels and FIG. 9B shows a correlation value calculation method on R pixels and B pixels.

$$Cv\_c = (|P12 - P32| + |P01 - P21| + |P21 - P41| + \quad (Eq. 17)$$
$$|P03 - P23| + |P23 - P43| + |P10 - P30| +$$
$$|P14 - P34| + |P11 - P31| + |P13 - P33| +$$
$$|P02 - P22| + |P22 - P42| + |P00 - P20| +$$
$$|P20 - P40| + |P04 - P24| + |P24 - P44|) \times \frac{1}{15}$$

Figure 10A:
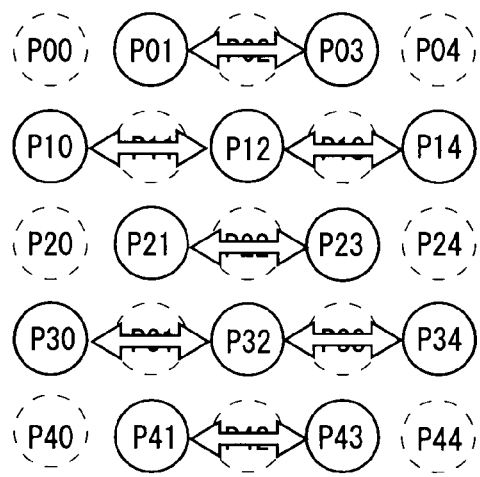
FIGS. 10A and 10B are views each showing a correlation value calculation method in the horizontal direction in the color area where the specified pixel is an R pixel or a B pixel.
Figure 10B:
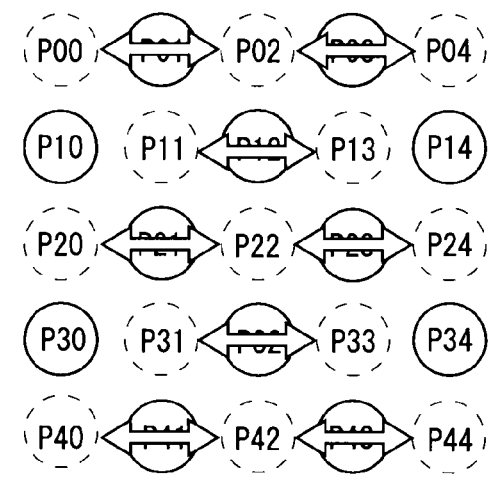

A correlation value in the horizontal direction is calculated from Eq. 18. FIGS. 10A and 10B are views each showing a correlation value calculation method in the horizontal direction, and FIG. 10A shows a correlation value calculation method on G pixels and FIG. 10B shows a correlation value calculation method on R pixels and B pixels.

$$Ch\_c = (|P21 - P23| + |P10 - P12| + |P12 - P14| + \quad (Eq. 18)$$
$$|P30 - P32| + |P32 - P34| + |P01 - P03| +$$
$$|P41 - P43| + |P11 - P13| + |P31 - P33| +$$
$$|P20 - P22| + |P22 - P24| + |P00 - P02| +$$
$$|P02 - P04| + |P40 - P42| + |P42 - P44|) \times \frac{1}{15}$$

Figure 11A:
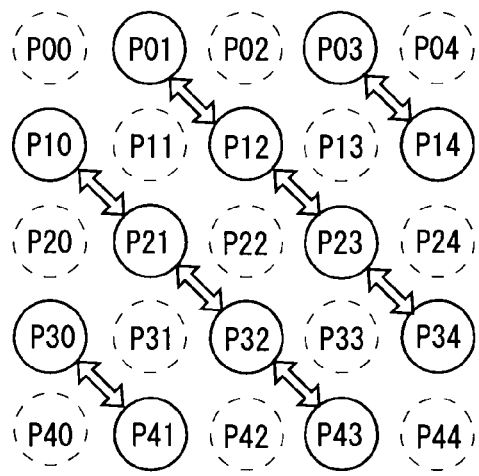
FIGS. 11A to 11C are views each showing a correlation value calculation method in the diagonal A direction in the color area where the specified pixel is an R pixel or a B pixel.
Figure 11B:
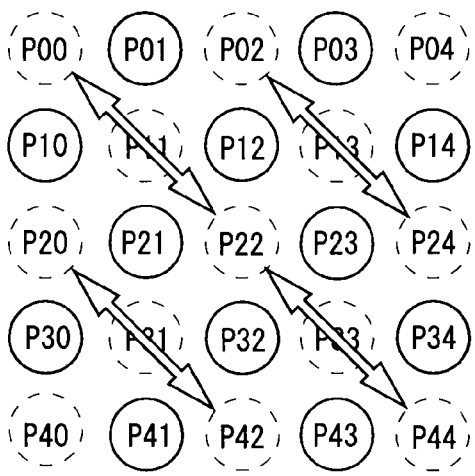
Figure 11C:
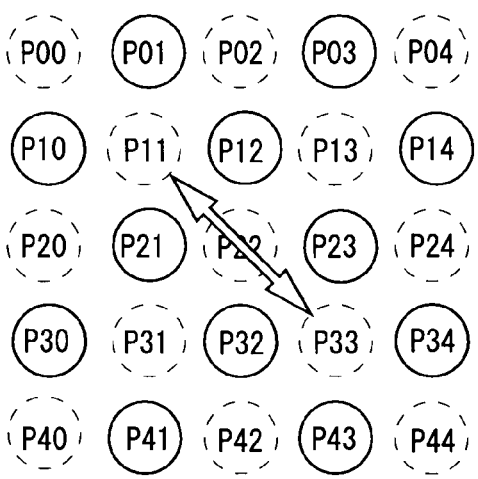

A correlation value in the diagonal A direction is calculated from Eq. 19. FIGS. 11A to 11C are views each showing a correlation value calculation method in the diagonal A direction, and FIG. 11A shows a correlation value calculation method on G pixels and FIGS. 11B and 11C show correlation value calculation methods on R pixels and B pixels, respectively.

$$Cd_{A\_c} = (|P12 - P23| \times 2 + |P21 - P32| \times 2 +$$
$$|P01 - P12| \times 2 + |P23 - P34| \times 2 +$$
$$|P10 - P21| \times 2 + |P32 - P43| \times 2 + |P03 - P14| \times 2 +$$
$$|P30 - P41| \times 2 + |P11 - P33| + |P00 - P22| +$$
$$|P22 - P44| + |P02 - P24| + |P20 - P42|) \times \frac{1}{13} \quad \text{(Eq. 19)}$$

Figure 12A:
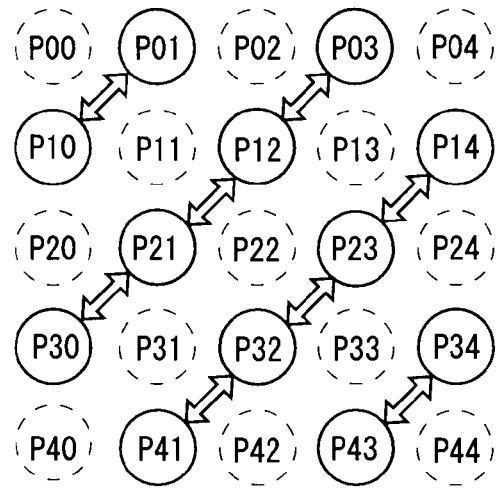
FIGS. 12A to 12C are views each showing a correlation value calculation method in the diagonal B direction in the color area where the specified pixel is an R pixel or a B pixel.
Figure 12B:
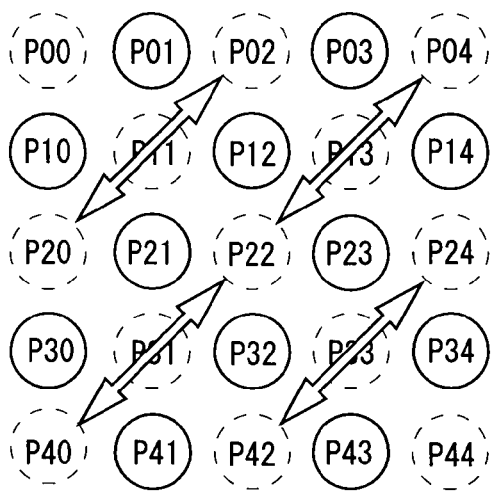
Figure 12C:
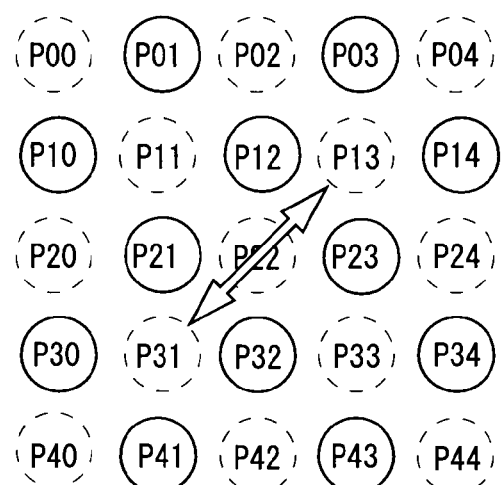

A correlation value in the diagonal B direction is calculated from Eq. 20. FIGS. 12A to 12C are views each showing a correlation value calculation method in the diagonal B direction, and FIG. 12A shows a correlation value calculation method on G pixels and FIGS. 12B and 12C show correlation value calculation methods on R pixels and B pixels, respectively.

$$Cd_{B\_c} = (|P12 - P21| \times 2 + |P23 - P32| \times 2 +$$
$$|P03 - P12| \times 2 + |P21 - P30| \times 2 +$$
$$|P14 - P23| \times 2 + |P32 - P41| \times 2 + |P01 - P10| \times 2 +$$
$$|P34 - P43| \times 2 + |P13 - P31| + |P04 - P22| +$$
$$|P22 - P40| + |P02 - P20| + |P24 - P42|) \times \frac{1}{13} \quad \text{(Eq. 20)}$$

Also in Eqs. 19 and 20, as discussed in Eq. 13, the differential value on two G pixels is multiplied by 2. Further, though the distance between pixels in FIGS. 11B, 11C, 12B and 12C is different from that in FIGS. 9A, 9B, 10A and 10B, herein the distance is regarded as equal, as the distance between two pixels with one pixel interposed therebetween. The differential value may be multiplied by a coefficient, however, taking the distance between these pixels into account.

(4-2) Correlation Value for Gray Image Having Low Chroma

Figure 13:
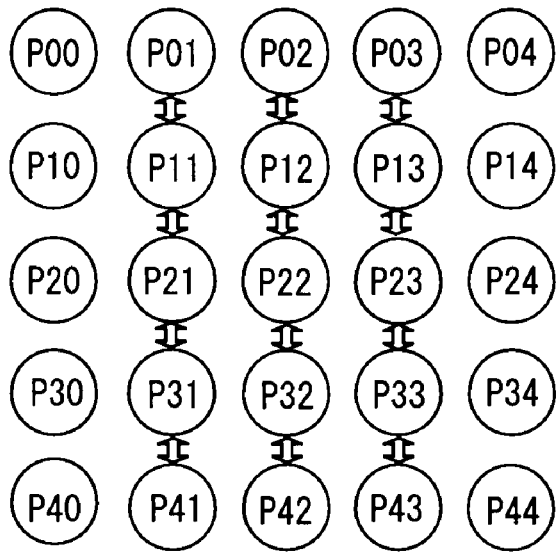
FIG. 13 is a view showing a correlation value calculation method in the vertical direction in a gray area.

For gray image having low chroma, correlation values are calculated without distinction of the type of the specified pixel, i.e., R, G or B. In other words, the correlation values are calculated by the following common computation, regardless of whatever the pixel array of the matrix area is among these shown in FIGS. 2B to 2E. A correlation value in the vertical direction is calculated from Eq. 21. FIG. 13 is a view showing a correlation value calculation method in the vertical direction.

$$Cv\_m = (|P02 - P12| + |P12 - P22| + |P22 - P32| +$$
$$|P32 - P42| + |P01 - P11| + |P11 - P21| +$$
$$|P21 - P31| + |P31 - P41| + |P03 - P13| +$$
$$|P13 - P23| + |P23 - P33| + |P33 - P43|) \times \frac{1}{6} \quad \text{(Eq. 21)}$$

Figure 14:
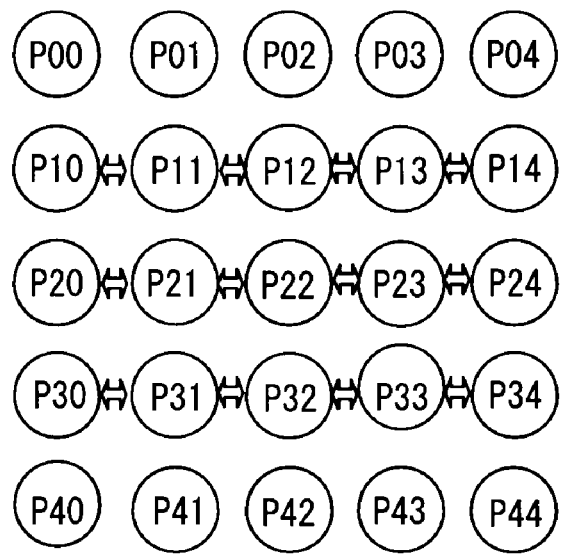
FIG. 14 is a view showing a correlation value calculation method in the horizontal direction in the gray area.

A correlation value in the horizontal direction is calculated from Eq. 22. FIG. 14 is a view showing a correlation value calculation method in the horizontal direction.

$$Ch\_m = (|P20 - P21| + |P21 - P22| + |P22 - P23| +$$
$$|P23 - P24| + |P10 - P11| + |P11 - P12| +$$
$$|P12 - P13| + |P13 - P14| + |P30 - P31| +$$
$$|P31 - P32| + |P32 - P33| + |P33 - P34|) \times \frac{1}{6} \quad \text{(Eq. 22)}$$

Figure 15:
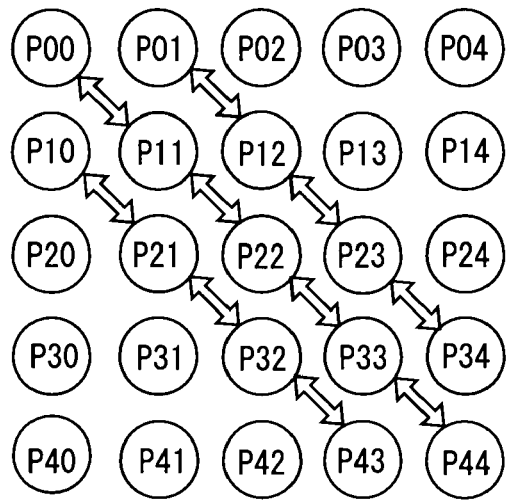
FIG. 15 is a view showing a correlation value calculation method in the diagonal A direction in the gray area.

A correlation value in the diagonal A direction is calculated from Eq. 23. FIG. 15 is a view showing a correlation value calculation method in the diagonal A direction.

$$Cd_{A\_m} = \quad \text{(Eq. 23)}$$
$$(|P00 - P11| + |P11 - P22| + |P22 - P33| + |P33 - P44| +$$
$$|P10 - P21| + |P21 - P32| + |P32 - P43| +$$
$$|P01 - P12| + |P12 - P23| + |P23 - P34|) \times \frac{1}{5}$$

A correlation value in the diagonal B direction is calculated from Eq. 24. FIG. 16 is a view showing a correlation value calculation method in the diagonal B direction.

$$Cd_{B\_m} = (|P04 - P13| + |P13 - P22| + |P22 - P31| + \quad \text{(Eq. 24)}$$
$$|P31 - P40| + |P03 - P12| + |P12 - P21| + |P21 - P30| +$$
$$|P14 - P23| + |P23 - P32| + |P32 - P41|) \times \frac{1}{5}$$

Further, the distance between pixels used for calculation of the differential value in FIGS. 13 and 14 is different from that in FIGS. 15 and 16. But, herein, the differential value is not multiplied by a coefficient taking the distance between pixels into account as discussed in Eq. 15. The reason is that the difference in the distance between pixels is not much large, but the pixel differential value in Eqs. 21 and 22, for example, may be multiplied by the square root of 2.

Further, in Eqs. 21 to 24, for easier comparison with the above-discussed correlation value for color image, the scale is matched. Specifically, the distance between pixels used for calculation shown in FIGS. 13 to 16 is a distance between two adjacent pixels. Therefore, in Eqs. 21 to 24, as the result that each pixel differential value is multiplied by 2 to match the scale, the final multiplier (⅙ and ⅕) in each equation is twice the reciprocal of the cumulative number. Since the correlation direction in a gray image, however, is judged by using only the correlation value for gray image, it is not always necessary to match the scale.

<5. Selection of Correlation Judgment Method and Pixel Interpolation Method>

The selection circuit 33 selects a correlation judgment method and a pixel interpolation method on the basis of the relation among the chroma factor $K_L$ calculated by the chroma value calculation circuit 31 and threshold values TH1 and TH2 (TH1≧TH2). Specifically, selection of the correlation judgment method is to select among methods of judging the correlation direction, by adopting the correlation value for gray image, by adopting the correlation value for color image or by performing an overall judgment on the correlation values for gray image and color image to select one and using the selected correlation value. Selection of the pixel interpolation method is to select whether the pixel interpolation method for gray image or the method for color image is adopted.

Figure 17:
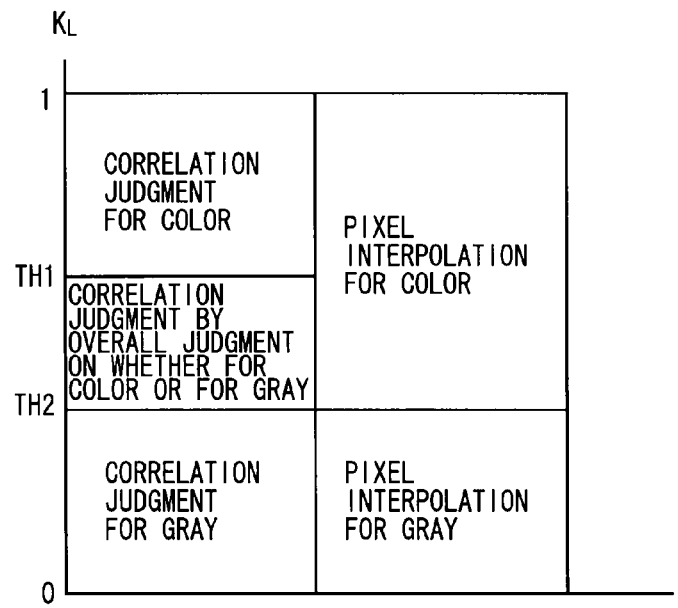
FIG. 17 is a view showing a criterion of judgment on a correlation judgment method and a pixel interpolation method.

FIG. 17 is a view showing the types of correlation judgment method and pixel interpolation method to be selected on the basis of the relation among the chroma factor $K_L$ and the threshold values TH1 and TH2. Specifically, selections are classified into the following patterns (a) to (c) of combinations of the methods.

(a) $K_L$>TH1 correlation judgment method: the correlation direction is judged by using the correlation value for color image.

pixel interpolation method: the pixel interpolation method for color image is used.

(b) TH1≧$K_L$>TH2 correlation judgment method: the correlation direction is judged by using the correlation value selected by overall judgment on the correlation values for color image and gray image.

pixel interpolation method: the pixel interpolation method for color image is used.

(c) TH2≧$K_L$ correlation judgment method: the correlation direction is judged by using the correlation value for gray image.

pixel interpolation method: the pixel interpolation method for gray image is used.

By using Eqs. 13 to 20, the correlation values Cv_c, Ch_c, $Cd_A$_c and $Cd_B$_c for color image in the four directions are calculated. Further, by using Eqs. 21 to 24, the correlation values Cv_m, Ch_m, $Cd_A$_m and $Cd_B$_m for gray image in the four directions are calculated. The selection circuit 33 selects judgment correlation values Cv, Ch, $Cd_A$ and $Cd_B$ which are to be used actually for judgment on the correlation direction, out of the calculated correlation values for gray image and color image as discussed below.

(5-1) (a) Judgment Correlation Value of When $K_L$>TH1

As shown in Eq. 25, the correlation values for color image are used as the judgment correlation values Cv, Ch, $Cd_A$ and $Cd_B$.

$$Cv=Cv\_c$$

$$Ch=Ch\_c$$

$$Cd_A=Cd_A\_c$$

$$Cd_B=Cd_B\_c \quad (Eq.25)$$

(5-2) (c) Judgment Correlation Value of When TH2≧$K_L$

As shown in Eq. 26, the correlation values for gray image are used as the judgment correlation values Cv, Ch, $Cd_A$ and $Cd_B$.

$$Cv=Cv\_m$$

$$Ch=Ch\_m$$

$$Cd_A=Cd_A\_m$$

$$Cd_B=Cd_B\_m \quad (Eq.26)$$

(5-3) (b) Judgment Correlation Value of When TH1 $K_L$>TH2

By overall judgment on the correlation values for gray image and color image, the judgment correlation values Cv, Ch, $Cd_A$ and $Cd_B$ are determined. Detailed discussion will be made below on this judgment method.

First, as shown in Eq. 27, a differential absolute value d_Cv_c between the correlation values Cv_c and Ch_c for color image is obtained.

$$d\_Cv\_c=abs(Cv\_c-Ch\_c) \quad (Eq.27)$$

As shown in Eq. 28, a differential absolute value d_Cv_m between the correlation values Cv_m and Ch_m for gray image is obtained.

$$d\_Cv\_m=abs(Cv\_m-Ch\_m) \quad (Eq.28)$$

Further, as shown in Eq. 29, a differential absolute value d_Cv between the differential absolute values d_Cv_c and d_Cv_m is compared with a threshold value THv.

$$abs(d\_Cv\_c-d\_Cv\_m)=d\_Cv \leq THv \quad (Eq.29)$$

If the relation between the differential absolute value d_Cv and the threshold value THv satisfies Eq. 29, further judgment is made on whether Eq. 30 is satisfied or not.

$$Cv\_c<Cv\_M \quad (Eq.30)$$

If Eq. 30 is satisfied, the correlation value Cv_c for color image is adopted as the judgment correlation value Cv. Specifically, Cv=Cv_c.

If Eq. 30 is not satisfied, the correlation value Cv_m for gray image is adopted as the judgment correlation value Cv. Specifically, Cv=Cv_m.

If the relation between the differential absolute value d_Cv and the threshold value THv satisfies Eq. 29, further judgment is made on whether Eq. 31 is satisfied or not.

$$Ch\_c<Ch\_m \quad (Eq.31)$$

If Eq. 31 is satisfied, the correlation value Ch_c for color image is adopted as the judgment correlation value Ch. Specifically, Ch=Ch_c.

If Eq. 31 is not satisfied, the correlation value Ch_m for gray image is adopted as the judgment correlation value Ch. Specifically, Ch=Ch_m.

Thus, when the differential absolute value d_Cv is smaller than the threshold value THv, the difference between the differential absolute value d_Cv_c and the differential absolute value d_Cv_m is small. In other words, it is assumed that no strong correlation is found in either the vertical direction or the horizontal direction. In such a case, in each of the vertical direction and the horizontal direction, the correlation values for gray image and color image are compared with each other, and the smaller one, i.e., one indicating high correlation is selected.

If the relation between the differential absolute value d_Cv and the threshold value THv does not satisfy Eq. 29, further judgment is made on whether Eq. 32 is satisfied or not.

$$d\_Cv\_c>d\_Cv\_m \quad (Eq.32)$$

If Eq. 32 is satisfied, the correlation values Cv_c and Ch_c for color image are adopted for correlation judgment. Specifically, Cv=Cv_c and Ch=Ch_c.

If Eq. 32 is not satisfied, the correlation values Cv_m and Ch_m for gray image are adopted for correlation judgment. Specifically, Cv=Cv_m and Ch=Ch_m.

Thus, when the differential absolute value d_Cv is larger than the threshold value THv, the difference between the differential absolute value d_Cv_c and the differential absolute value d_Cv_m is large. In other words, it is assumed that a strong correlation is found in either the vertical direction or the horizontal direction. In such a case, the differential absolute values d_Cv_c and d_Cv_m are compared with each other, and the correlation value for the image having the larger differential absolute value is selected.

Subsequently, as shown in Eq. 33, a differential absolute value d_Cdg_c between the correlation values $Cd_A$_c and $Cd_B$_c for color image is obtained.

$$d\_Cdg\_c=abs(Cd_A\_c-Cd_B\_c) \quad (Eq.33)$$

Further, as shown in Eq. 34, a differential absolute value $d\_Cdg\_m$ between the correlation values $Cd_A\_m$ and $Cd_B\_m$ for gray image is obtained.

$$d\_Cdg\_m = abs(Cd_A\_m - Cd_B\_m) \quad (Eq.34)$$

Furthermore, as shown in Eq. 35, a differential absolute value $d\_Cdg$ between the differential absolute values $d\_Cdg\_c$ and $d\_Cdg\_m$ is compared with a threshold value THdg.

$$abs(d\_Cdg\_c - d\_Cdg\_m) = d\_Cdg \leq THdg \quad (Eq.35)$$

If the relation between the differential absolute value $d\_Cdg$ and the threshold value THdg satisfies Eq. 35, further judgment is made on whether Eq. 36 is satisfied or not.

$$Cd_A\_c < Cd_A\_m \quad (Eq.36)$$

If Eq. 36 is satisfied, the correlation value $Cd_A\_c$ for color image is adopted as the judgment correlation value $Cd_A$. Specifically, $Cd_A = Cd_A\_c$.

If Eq. 36 is not satisfied, the correlation value $Cd_A\_m$ for gray image is adopted as the judgment correlation value $Cd_A$. Specifically, $Cd_A = Cd_A\_m$.

If the relation between the differential absolute value $d\_Cdg$ and the threshold value THdg satisfies Eq. 35, further judgment is made on whether Eq. 37 is satisfied or not.

$$Cd_B\_c < Cd_B\_m \quad (Eq.37)$$

If Eq. 37 is satisfied, the correlation value $Cd_B\_c$ for color image is adopted as the judgment correlation value $Cd_B$. Specifically, $Cd_B = Cd_B\_c$.

If Eq. 37 is not satisfied, the correlation value $Cd_B\_m$ for gray image is adopted as the judgment correlation value $Cd_B$. Specifically, $Cd_B = Cd_B\_m$.

Thus, when the differential absolute value $d\_Cdg$ is smaller than the threshold value THdg, the difference between the differential absolute value $d\_Cdg\_c$ and the differential absolute value $d\_Cdg\_m$ is small. In other words, it is assumed that no strong correlation is found in either the diagonal A direction or the diagonal B direction. In such a case, in each of the diagonal A direction and the diagonal B direction, the correlation values for gray image and color image are compared with each other, and the smaller one, i.e., one indicating high correlation is selected.

If the relation between the differential absolute value $d\_Cdg$ and the threshold value THdg does not satisfy Eq. 35, further judgment is made on whether Eq. 38 is satisfied or not.

$$d\_Cdg\_c > d\_Cdg\_m \quad (Eq.38)$$

If Eq. 38 is satisfied, the correlation values $Cd_A\_c$ and $Cd_B\_c$ for color image are adopted for correlation judgment. Specifically, $Cd_A = Cd_A\_c$ and $Cd_B = Cd_B\_c$ If Eq. 38 is not satisfied, the correlation values $Cd_A\_m$ and $Cd_B\_m$ for gray image are adopted for correlation judgment. Specifically, $Cd_A = Cd_A\_m$ and $Cd_B = Cd_B\_m$.

Thus, when the differential absolute value $d\_Cdg$ is larger than the threshold value THdg, the difference between the differential absolute value $d\_Cdg\_c$ and the differential absolute value $d\_Cdg\_m$ is large. In other words, it is assumed that a strong correlation is found in either the diagonal A direction or the diagonal B direction. In such a case, the differential absolute values $d\_Cdg\_c$ and $d\_Cdg\_m$ are compared with each other, and the correlation value for the image having the larger differential absolute value is selected.

In the case of (b), where $TH1 \geq K_L > TH2$, through the above operation, the judgment correlation values Cv, Ch, $Cd_A$ and $Cd_B$ are selected by overall judgment on the correlation values for gray image and color image.

The selection circuit 33 performs the above computation, to select the judgment correlation values Cv, Ch, $Cd_A$ and $Cd_B$ in each of the cases (a), (b) and (c).

Thus, in the first preferred embodiment, the combinations of the correlation judgment method and the pixel interpolation method are classified into three patterns from the relation among the chroma factor $K_L$ and the threshold values TH1 and TH2. Specifically, instead of providing one threshold value and making a judgment on whether the gray image or the color image, two threshold values TH1 and TH2 are provided and a boundary area between the gray image and the color image is thereby smoothed. Particularly, in an image existing near the boundary between a gray image and a color image, it thereby becomes possible to ease the visual unpleasantness after interpolation.

More specifically, the image existing near the boundary between a gray image and a color image has almost equal values of RGB components but there is a little variation in these values. Therefore, for judgment on correlation, paying attention to that the variation in RGB components is small, the correlation value is calculated by using pixels which are as near as possible without distinction of RGB. Alternatively, paying attention to that there is some variation in RGB components, the correlation value is calculated with distinction of RGB. Through overall judgment over such two ideas to select an optimum correlation value, the accuracy in judgment on the correlation direction is improved. On the other hand, if the variation in RGB components is disregarded and the image near the boundary is regarded as a gray image to perform pixel interpolation, there arises a possibility that false colors may occur. Then, as to pixel interpolation, a pixel interpolation process for color image is performed.

Further, in the first preferred embodiment, the chroma factor $K_L$ obtained by normalizing the chroma evaluation value L is used and the chroma factor $K_L$ and the threshold values TH1 and TH2 are compared with one another to judge whether a gray image or a color image. But, this is done for convenience in operation, and substantially, the chroma evaluation value L and the two threshold values are compared with one another, to judge whether a gray image or a color image. After selecting the correlation judgment method and the pixel interpolation method, the selection circuit 33 gives information on this selection to the first correlation judgment circuit 341 and the second correlation judgment circuit 342. The selection information includes information indicating whether the correlation judgment method and the pixel interpolation method are for gray image or for color image and information indicating the selected judgment correlation values Cv, Ch, $Cd_A$ and $Cd_B$.

<6. Judgment on Correlation Direction of Each Pixel>

As discussed above, after selecting the judgment correlation values Cv, Ch, $Cd_A$ and $Cd_B$, the selection circuit 33 outputs the pixel signal and the selection information including the information on the judgment correlation values to the first correlation judgment circuit 341 and the second correlation judgment circuit 342. Specifically, the judgment correlation values Cv, Ch, $Cd_A$ and $Cd_B$ calculated by the selection circuit 33 are outputted to both the first correlation judgment circuit 341 and the second correlation judgment circuit 342 and the pixel signal inputted from the signal processing circuit 2 is also outputted to both the first correlation judgment circuit 341 and the second correlation judgment circuit 342. The first correlation judgment circuit 341 and the second correlation judgment circuit 342 are processing parts to judge the correlation with respect to the specified pixel on the basis of the judgment correlation values Cv, Ch, $Cd_A$ and $Cd_B$. The first correlation judgment circuit 341 judges the correlation direction, with the correlation with respect to the specified pixel evaluated highly. The second correlation judgment circuit 342 judges the correlation direction, with the correlation with respect to the specified pixel evaluated low, as compared with the first correlation judgment circuit 341.

Figure 18:
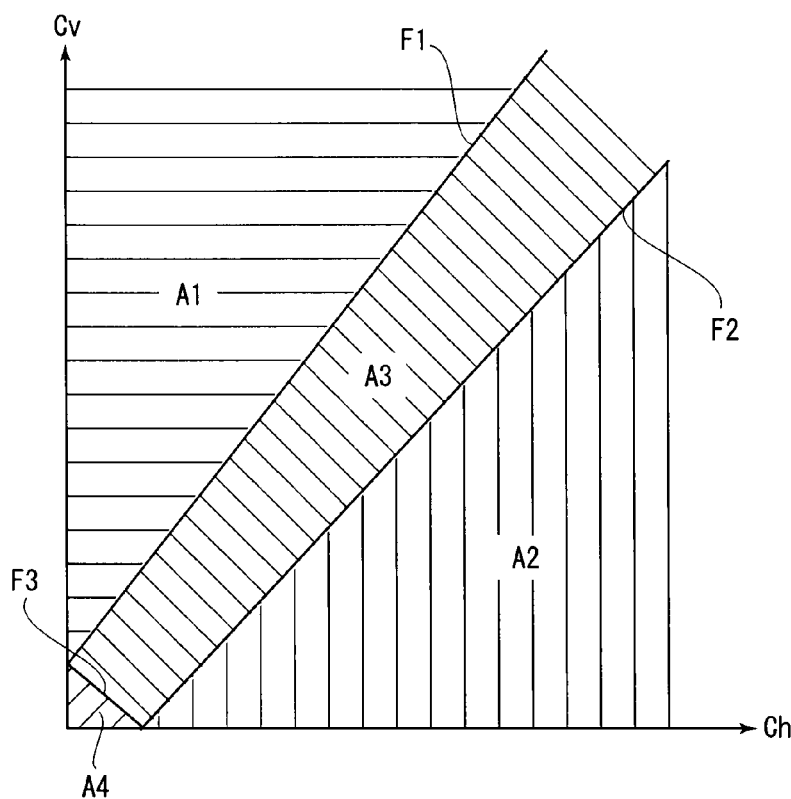
FIG. 18 is a graph showing a correspondence where the correlation is evaluated to be high in the vertical and horizontal directions.

FIG. 18 is a graph showing a correspondence of correlation values which the first correlation judgment circuit 341 uses for judgment on the correlation direction. The vertical axis represents the judgment correlation value Cv and the horizontal axis represents the judgment correlation value Ch.

When the relation between the judgment correlation value Cv and the judgment correlation value Ch is found in an area A1, the first correlation judgment circuit 341 judges that the correlation direction of the specified pixel is the horizontal direction. When the relation between the judgment correlation value Cv and the judgment correlation value Ch is found in an area A2, the first correlation judgment circuit 341 judges that the correlation direction of the specified pixel is the vertical direction. When the relation between the judgment correlation value Cv and the judgment correlation value Ch is found in an area A3, the first correlation judgment circuit 341 judges that the specified pixel has no correlation in any direction. When the relation between the judgment correlation value Cv and the judgment correlation value Ch is found in an area A4, the first correlation judgment circuit 341 judges that the correlation of the specified pixel is high in both the vertical and horizontal directions.

Figure 19:
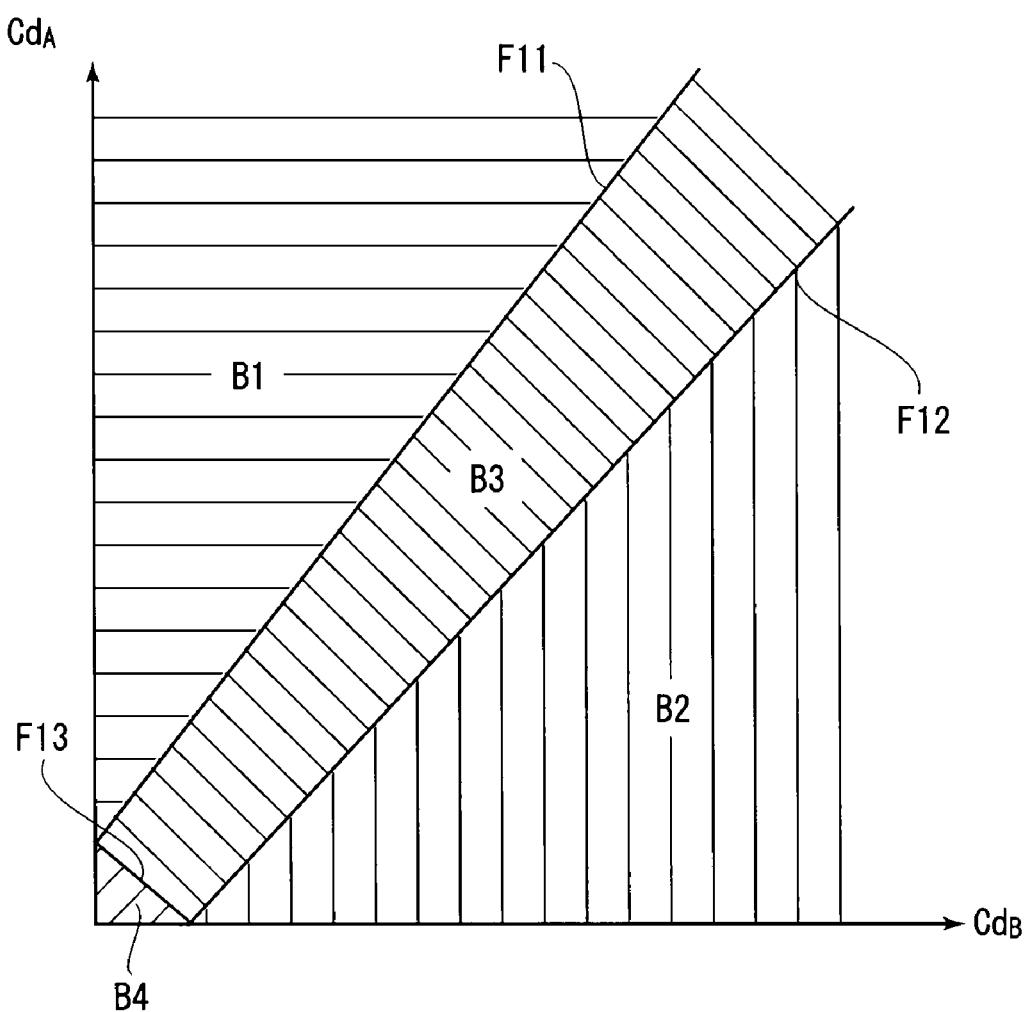
FIG. 19 is a graph showing a correspondence where the correlation is evaluated to be high in the diagonal A and diagonal B directions.

The first correlation judgment circuit 341 uses the correspondence view shown in FIG. 19, together with that of FIG. 18. The correspondence view of FIG. 19 shows a correspondence between the judgment correlation values $Cd_A$ and $Cd_B$ and the correlation direction. The vertical axis of FIG. 19 represents the judgment correlation value $Cd_A$ and the horizontal axis represents the judgment correlation value $Cd_B$. The area B1 is an area for judgment that the correlation direction is the diagonal B direction, and the area B2 is an area for judgment that the correlation direction is the diagonal A direction. Further, the area B3 is an area for judgment that there is no correlation in any direction, and the area B4 is an area for judgment that the correlation is high in both the diagonal A direction and the diagonal B direction.

The first correlation judgment circuit 341 compares the four judgment correlation values Cv, Ch, $Cd_A$ and $Cd_B$. Then, when the judgment correlation value Cv or the judgment correlation value Ch is smallest, the correspondence view of FIG. 18 is used. The first correlation judgment circuit 341 determines the correlation direction, depending on which of the areas A1 to A4 the correspondence of the judgment correlation values is found in. On the other hand, when the judgment correlation value $Cd_A$ or the judgment correlation value $Cd_B$ is smallest, the correspondence view of FIG. 19 is used. Then, the first correlation judgment circuit 341 determines the correlation direction, depending on which of the areas B1 to B4 the correspondence of the judgment correlation values is found in.

After the correlation direction is determined, as discussed later, the first interpolation circuit 351 performs the pixel interpolation process by using the pixels in the correlation direction. Specifically, when the correspondence of the judgment correlation values is found in the area A1, the pixel interpolation is performed by using the pixels in the horizontal direction. When the correspondence of the judgment correlation values is found in the area A2, the pixel interpolation is performed by using the pixels in the vertical direction. When the correspondence of the judgment correlation values is found in the area B1, the pixel interpolation is performed by using the pixels in the diagonal B direction. When the correspondence of the judgment correlation values is found in the area B2, the pixel interpolation is performed by using the pixels in the diagonal A direction. Further, when the correspondence of the judgment correlation values is found in the area A3 or B3, for example, median interpolation is performed. When the correspondence of the judgment correlation values is found in the area A4 or B4, mean value interpolation is performed.

Figure 20:
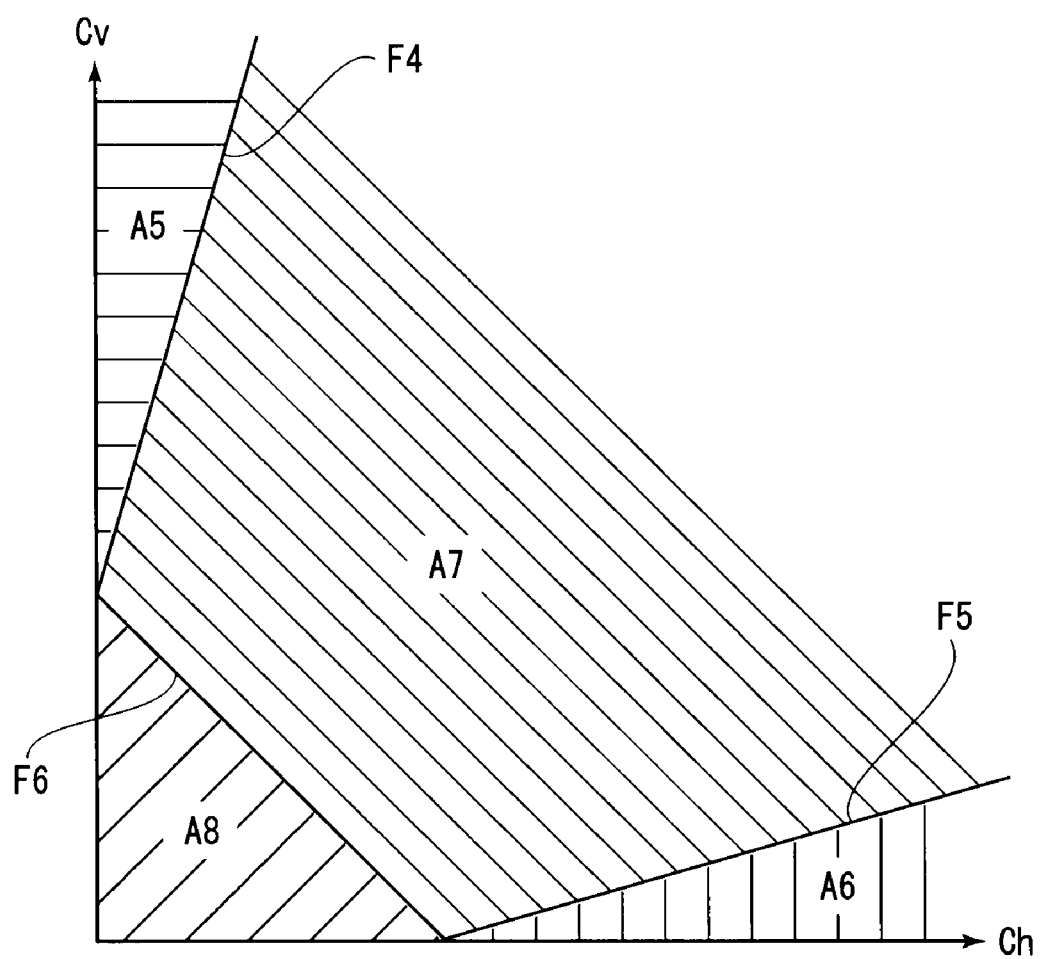
FIG. 20 is a graph showing a correspondence where the correlation is evaluated to be low in the vertical and horizontal directions.

On the other hand, FIG. 20 is a graph showing a correspondence of judgment correlation values which the second correlation judgment circuit 342 uses for judgment on the correlation direction. The vertical axis represents the judgment correlation value Cv and the horizontal axis represents the judgment correlation value Ch.

When the relation between the judgment correlation value Cv and the judgment correlation value Ch is found in an area A5, the second correlation judgment circuit 342 judges that the correlation direction of the specified pixel is the horizontal direction. When the relation between the judgment correlation value Cv and the judgment correlation value Ch is found in an area A6, the second correlation judgment circuit 342 judges that the correlation direction of the specified pixel is the vertical direction. When the relation between the judgment correlation value Cv and the judgment correlation value Ch is found in an area A7, the second correlation judgment circuit 342 judges that the specified pixel has no correlation in any direction. When the relation between the judgment correlation value Cv and the judgment correlation value Ch is found in an area A8, the second correlation judgment circuit 342 judges that the correlation of the specified pixel is high in both the vertical and horizontal directions.

Figure 21:
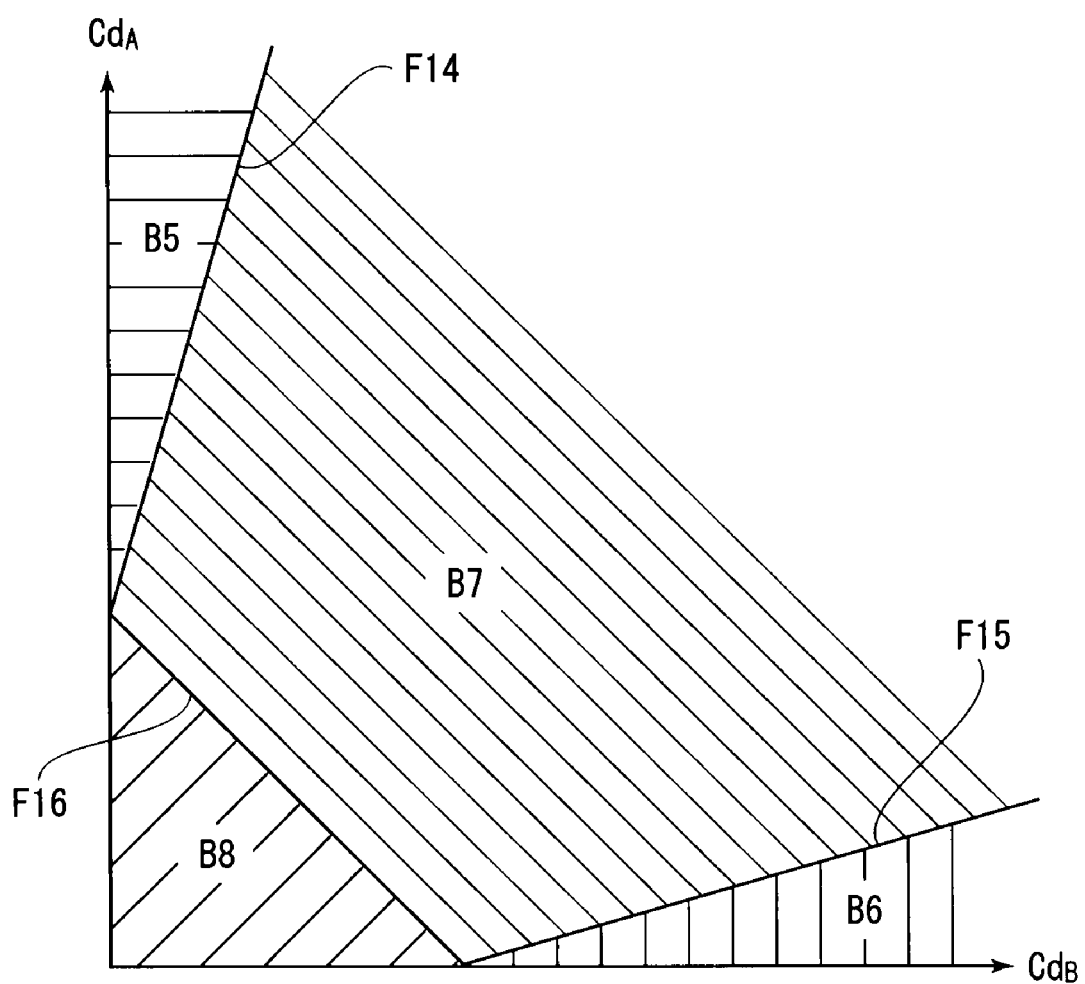
FIG. 21 is a graph showing a correspondence where the correlation is evaluated to be low in the diagonal A and diagonal B directions.

The second correlation judgment circuit 342 uses the correspondence view shown in FIG. 21, together with that of FIG. 20. The correspondence view of FIG. 21 shows a correspondence between the judgment correlation values $Cd_A$ and $Cd_B$ and the correlation direction. The vertical axis of FIG. 21 represents the judgment correlation value $Cd_A$ and the horizontal axis represents the judgment correlation value $Cd_B$. The area B5 is an area for judgment that the correlation direction is the diagonal B direction, and the area B6 is an area for judgment that the correlation direction is the diagonal A direction. Further, the area B7 is an area for judgment that there is no correlation in any direction, and the area B8 is an area for judgment that the correlation is high in both the diagonal A direction and the diagonal B direction.

The second correlation judgment circuit 342 compares the four judgment correlation values Cv, Ch, $Cd_A$ and $Cd_B$. Then, when the judgment correlation value Cv or the judgment correlation value Ch is smallest, the correspondence view of FIG. 20 is used. The second correlation judgment circuit 342 determines the correlation direction, depending on which of the areas A5 to A8 the correspondence of the judgment correlation values is found in. On the other hand, when the judgment correlation value $Cd_A$ or the judgment correlation value $Cd_B$ is smallest, the correspondence view of FIG. 21 is used. Then, the second correlation judgment circuit 342 determines the correlation direction, depending on which of the areas B5 to B8 the correspondence of the judgment correlation values is found in.

After the correlation direction is determined, as discussed later, the second interpolation circuit 352 performs the pixel interpolation process by using the pixels in the correlation direction. Specifically, when the correspondence of the judgment correlation values is found in the area A5, the pixel interpolation is performed by using the pixels in the horizontal direction. When the correspondence of the judgment correlation values is found in the area A6, the pixel interpolation is performed by using the pixels in the vertical direction. When the correspondence of the judgment correlation values is found in the area B5, the pixel interpolation is performed by using the pixels in the diagonal B direction. When the correspondence of the judgment correlation values is found in the area B6, the pixel interpolation is performed by using the pixels in the diagonal A direction. Further, when the correspondence of the judgment correlation values is found in the area A7 or B7, for example, the median interpolation is performed. When the correspondence of the judgment correlation values is found in the area A8 or B8, the mean value interpolation is performed.

Thus, the first correlation judgment circuit 341 and the second correlation judgment circuit 342 determine the correlation direction by using the correspondence of the judgment correlation values shown in FIGS. 18 to 21. As a result, the first correlation judgment circuit 341 determines the correlation direction, with the correlation between the specified pixel and its surrounding pixels evaluated highly. In other words, the first correlation judgment circuit 341 actively uses the pixels in the correlation direction, to perform interpolation. On the other hand, the second correlation judgment circuit 342 determines the correlation direction, with the correlation between the specified pixel and its surrounding pixels evaluated low, as compared with the first correlation judgment circuit 341. In other words, the second interpolation circuit 352 is an interpolation circuit which actively adopts the median interpolation and the mean value interpolation.

Foe example, if there is a relation that the judgment correlation value Ch is a little smaller than the judgment correlation value Cv, the first correlation judgment circuit 341 actively adopts the relation to judge that the correlation in the horizontal direction is high. On the other hand, if there is a relation that the judgment correlation value Ch is sufficiently smaller than the judgment correlation value Cv, the second correlation judgment circuit 342 judges that the correlation in the horizontal direction is high.

Alternatively, if there is a relation that the judgment correlation value $Cd_B$ is a little smaller than the judgment correlation value $Cd_A$, the first correlation judgment circuit 341 actively adopts the relation to judge that the correlation in the diagonal B direction is high. On the other hand, if there is a relation that the judgment correlation value $Cd_B$ is sufficiently smaller than the judgment correlation value $Cd_A$, the second correlation judgment circuit 342 judges that the correlation in the diagonal B direction is high.

<7. Pixel Interpolation Process>

Now, discussion will be made on the pixel interpolation process performed by the first interpolation circuit 351 and the second interpolation circuit 352. The first interpolation circuit 351 and the second interpolation circuit 352, as discussed above, perform the pixel interpolation process on the correlation direction determined by the first correlation judgment circuit 341 and the second correlation judgment circuit 342. Then, the first interpolation circuit 351 and the second interpolation circuit 352 perform the pixel interpolation process for either gray image or color image on the basis of the selection information outputted from the selection circuit 33. Specifically, if the above-discussed pattern (c) is selected in the selection circuit 33, the pixel interpolation process for gray image is performed, and if the above pattern (a) or (b) is selected in the selection circuit 33, the pixel interpolation process for color image is performed (see <5. Selection of Correlation Judgment Method and Pixel Interpolation Method>.

(7-1) Pixel Interpolation for Gray Image

If the above-discussed pattern (c) is selected in the selection circuit 33, the pixel interpolation process for gray image is performed on the correlation direction determined in the first correlation judgment circuit 341 and the second correlation judgment circuit 342. In the pixel interpolation for gray image, without distinction of the color component of the specified pixel among R, G and B, the pixel interpolation process is performed by using the pixels existing in the determined correlation direction. In other words, without consideration of what color component among R, G and B the specified pixel is and what color component among R, G and B its surrounding pixels are, the specified pixel is interpolated by using its surrounding pixels.

Specifically, if the correlation value is judged to be high in the vertical direction, in other words, if the first correlation judgment circuit 341 judges that the correlation direction belongs to the area A2, the first interpolation circuit 351 performs the pixel interpolation process by using Eq. 39. Alternatively, if the second correlation judgment circuit 342 judges that the correlation direction belongs to the area A6, the second interpolation circuit 352 performs the pixel interpolation process by using Eq. 39.

$$S_{Out} = \frac{P12 + 2 \times P22 + P32}{4} \tag{Eq. 39}$$

Further, if the correlation value is judged to be high in the horizontal direction, in other words, if the first correlation judgment circuit 341 judges that the correlation direction belongs to the area Al, the first interpolation circuit 351 performs the pixel interpolation process by using Eq. 40. Alternatively, if the second correlation judgment circuit 342 judges that the correlation direction belongs to the area A5, the second interpolation circuit 352 performs the pixel interpolation process by using Eq. 40.

$$S_{Out} = \frac{P21 + 2 \times P22 + P23}{4} \tag{Eq. 40}$$

Furthermore, if the correlation value is judged to be high in the diagonal A direction, in other words, if the first correlation judgment circuit 341 judges that the correlation direction belongs to the area B2, the first interpolation circuit 351 performs the pixel interpolation process by using Eq. 41. Alternatively, if the second correlation judgment circuit 342 judges that the correlation direction belongs to the area B6, the second interpolation circuit 352 performs the pixel interpolation process by using Eq. 41.

$$S_{Out} = \frac{P11 + 2 \times P22 + P33}{4} \tag{Eq. 41}$$

Still further, if the correlation value is judged to be high in the diagonal B direction, in other words, if the first correlation judgment circuit 341 judges that the correlation direction belongs to the area B1, the first interpolation circuit 351 performs the pixel interpolation process by using Eq. 42. Alternatively, if the second correlation judgment circuit 342 judges that the correlation direction belongs to the area B5, the second interpolation circuit 352 performs the pixel interpolation process by using Eq. 42.

$$S_{out} = \frac{P13 + 2 \times P22 + P31}{4} \quad \text{(Eq. 42)}$$

In Eqs. 39 to 42, the term of P22 is multiplied by the coefficient of "2" and this is for weighting in accordance with the distance from the specified pixel. Further, if it is judged that the correlation is high in all the directions (the area A4, B4, A8 or B8), for example, the mean value interpolation is performed. If it is judged that there is no correlation in any direction (the area A3, B3, A7 or B7), for example, the median interpolation is performed.

(7-2) Pixel Interpolation for Color Image

If the above-discussed pattern (a) or (b) is selected in the selection circuit 33, the first interpolation circuit 351 and the second interpolation circuit 352 perform the pixel interpolation process for color image on the correlation direction determined in the first correlation judgment circuit 341 and the second correlation judgment circuit 342. In the pixel interpolation for color image, an interpolation computation method changes depending on the color component of the specified pixel among R, G and B. Specifically, the pixel interpolation process is performed by using the pixels which exist in the correlation direction determined by the first correlation judgment circuit 341 and the second correlation judgment circuit 342 and have the same color as the color of the pixel to be interpolated.

For example, if the specified pixel is a G pixel and the correlation in the vertical direction is judged to be high (the area A2 or A6), the R component and the B component of the specified pixel are interpolated by using the R pixels and the B pixels existing in the vertical direction. Further, if the specified pixel is a G pixel and the correlation in the horizontal direction is judged to be high (the area A1 or A5), the B component and the R component of the specified pixel are interpolated by using the B pixels and the R pixels existing in the horizontal direction.

If the specified pixel is a G pixel and the correlation in the diagonal A direction is judged to be high (the area B2 or B6), the R component and the B component of the specified pixel are interpolated by using the R pixels and the B pixels existing in the diagonal A direction. Further, if the specified pixel is a G pixel and the correlation in the diagonal B direction is judged to be high (the area B1 or B5), the B component and the R component of the specified pixel are interpolated by using the B pixels and the R pixels existing in the diagonal B direction.

If there is a pixel having the color component to be interpolated on the line in a direction for interpolation, the pixel interpolation process can be performed by calculating an average value of the pixels having the same color which exist on the line or performing linear interpolation. Depending on the pixel array, however, there is sometimes no pixel having the color component to be interpolated on the line in the direction for the interpolation. In such a case, a method in which a pixel value of the pixel to be interpolated is estimated from the rate of pixel change (Laplacian) in a direction orthogonal to the line in the direction for the interpolation may be used.

Thus, the pixel interpolation process for color image is performed by using the pixels existing in the correlation direction, which have the same color as the color of the pixel to be interpolated, to interpolate the specified pixel. Alternatively, if there is no pixel having the same color as the color of the pixel to be interpolated in the correlation direction, interpolation is performed on the specified pixel by using the estimated value as a pixel value of the pixel having the same color in the correlation direction.

<8. Color Space Conversion Process>

After performing the pixel interpolation process on each pixel, the first interpolation circuit 351 outputs a complete pixel signal after interpolation to the first color space conversion circuit 361. In other words, as to the signals inputted to the first color space conversion circuit 361, each pixel includes signals for all the color components of RGB. Further, after performing the pixel interpolation process on each pixel, the second interpolation circuit 352 outputs a complete pixel signal after interpolation to the second color space conversion circuit 362. In other words, as to the signals inputted to the second color space conversion circuit 362, each pixel includes signals for all the color components of RGB.

Then, the first color space conversion circuit 361 generates a luminance signal (Y signal) from the pixel signal of RGB for each pixel. On the other hand, the second color space conversion circuit 362 generates color difference signals (Cb and Cr signals) from the pixel signal of RGB for each pixel. Thus, the RGB signals of Bayer array outputted from the image pickup element 1 are converted into the luminance signals (Y signals) and the color difference signals (Cb and Cr signals).

The luminance signal outputted from the first color space conversion circuit 361 is a signal generated from the RGB signal which is interpolated by the first interpolation circuit 351. The RGB signal interpolated by the first interpolation circuit 351 is a signal which has been subjected to the pixel interpolation with the correlation evaluated highly, i.e., a signal maintaining high resolution. It is thereby possible to keep the sense of resolution of the generated YUV signal high.

On the other hand, the color difference signals outputted from the second color space conversion circuit 362 are signals generated from the RGB signal which is interpolated by the second interpolation circuit 352. The RGB signal interpolated by the second interpolation circuit 352 is a signal which has been subjected to the pixel interpolation with the correlation evaluated relatively low, i.e., a signal whose noise is suppressed. In other words, this is a signal to which an LPF (Low Pass Filter) is applied. It is thereby possible to suppress the noise of the generated YUV signal even if a RAW image having much noise is outputted from the image pickup element 1.

The luminance signal (Y signal) outputted from the first color space conversion circuit 361 and the color difference signals (Cb and Cr signals) outputted from the second color space conversion circuit 362 are stored into the enlargement circuit 37.

<9. Enlargement Process>

The enlargement circuit 37 performs enlargement of the size of a pickup image. Though the enlargement ratio can be set as appropriate, discussion will be made herein on an exemplary case of enlarging the input image twice in the horizontal and vertical directions, respectively.

Figure 22:
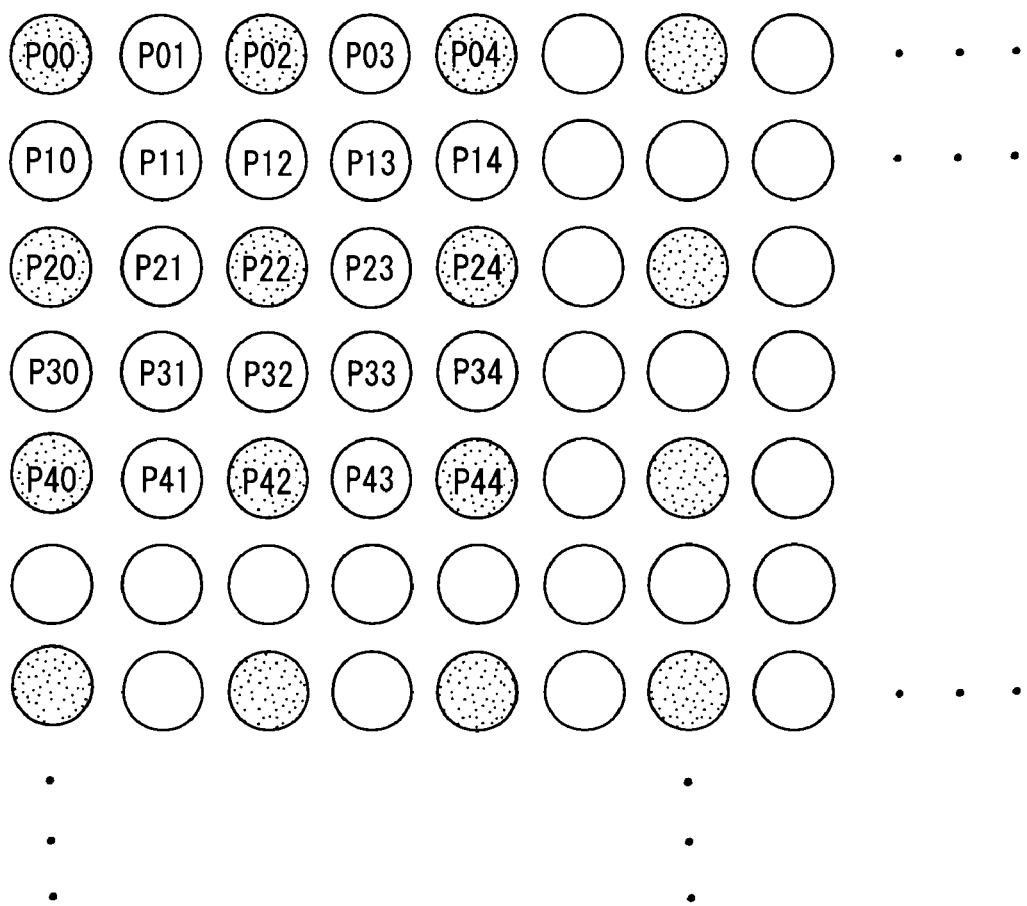
FIG. 22 is a view showing an array of enlarged pixel signals.

FIG. 22 is a view showing a pixel array after enlargement. In FIG. 22, the pixels represented by sand-pattern circles are those existing before the enlargement process and the pixels represented by blank circles are those generated by the enlargement process, i.e., interpolated pixels for enlargement. In the case of FIG. 22, the pixels P00, P02, P04, . . . are the pixels existing before the enlargement process and the pixels P01, P03, ... are the pixels generated by the enlargement process.

The enlargement circuit 37 performs computation expressed by Eq. 43, to execute enlargement and interpolation of the pixel signals by bilinear interpolation.

$$P01=(P00+P02)/2$$

$$P21=(P20+P22)/2$$

$$P10=(P00+P20)/2$$

$$P12=(P02+P22)/2$$

$$P11=(P00+P02+P20+P22)/4 \quad (Eq.43)$$

Though the enlargement circuit 37 performs enlargement of the image by bilinear interpolation without consideration of the correlation direction in the first preferred embodiment, B-spline interpolation, bicubic interpolation or the like may be also used.

<10. Correlation Direction Interpolation Process>

Next, discussion will be made on interpolation of the correlation direction performed by the correlation direction interpolation circuit 38. The correlation direction interpolation circuit 38 receives the correlation direction determined by first correlation judgment circuit 341. The correlation direction determined by the first correlation judgment circuit 341 is determined with respect to the pixel existing before the enlargement process performed by the enlargement circuit 37. In other words, the pixels represented by sand-pattern circles in FIG. 22 are associated with the correlation directions thereof and the pixels generated by the enlargement process (pixels represented by blank circles) are associated with no correlation direction. Then, the correlation direction interpolation circuit 38 performs interpolation of correlation directions with respect to the pixel signals generated by the enlargement process, by using such an algorithm as discussed below.

FIGS. 23A to 23D each show a pixel array pattern of 5×5 in an initial state (i.e., in a state before the interpolation of the correlation direction). In the initial state, the pixel array pattern around the specified pixel corresponds to any one of Patterns T1 to T4 shown in FIGS. 23A to 23D. Also in FIGS. 23A to 23D, the pixels represented by sand-pattern circles are those existing before the enlargement process and the pixels represented by blank circles are those generated by the enlargement process.

In Pattern T4, the correlation direction of the specified pixel has been already determined. Therefore, hereinafter, in Patterns T1 to T3, the correlation directions of the specified pixels are interpolated. The process of interpolating the correlation direction consists of Steps 1 and 2.

The following discussion is made with reference to FIGS. 24A-24F to 33A-33D in which some pixels are represented by crosshatched circles. The pixels represented by crosshatched circles are those associated with the correlation directions. The pixels associated with the correlation values are, first, those existing before the enlargement process, whose correlation directions are determined by the first correlation judgment circuit 341. Second, the pixels are those generated by the enlargement process, whose correlation directions are interpolated by the correlation direction interpolation circuit 38. Therefore, in a state before the correlation directions are interpolated, the pixels represented by crosshatched circles correspond to those represented by sand-pattern circles in FIGS. 22 and 23A to 23D.

In the first preferred embodiment, the correlation direction interpolation circuit 38 uses the correlation directions determined by the first correlation judgment circuit 341, for interpolation. Specifically, the correlation direction interpolation circuit 38 uses the correlation directions determined by actively adopting the correlation. Alternatively, the correlation directions determined by the second correlation judgment circuit 342 may be used for interpolation.

Further, in FIGS. 24A-24F to 33A-33D, the reference signs V, H, DA, DB, M and S represent the correlation directions determined by the first correlation judgment circuit 341 or the correlation directions determined by interpolation. The reference sign V represents the vertical direction, H represents the horizontal direction, DA represents the diagonal A direction and DB represents the diagonal B direction. The reference sign M represents a pixel having correlation in all the directions and S represents a pixel of isolated point, having no correlation in any direction. Though not shown except some part in the above figures, pixels whose correlation directions are not determined are represented by reference sign N as appropriate. In FIGS. 24A-24F to 33A-33D, object pixels (specified pixels) for interpolation of correlation directions are represented by thick-line circles.

<10-1. Step 1>

Figure 24A:
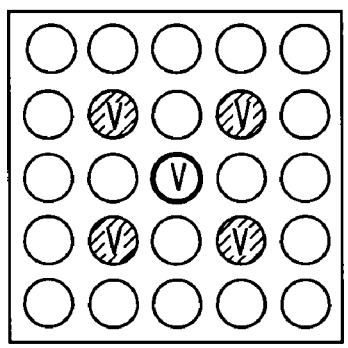
FIGS. 24A to 24F are views each showing a method of interpolating a correlation direction in Step 1.
Figure 24B:
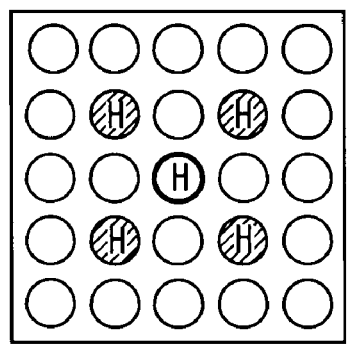
Figure 24C:
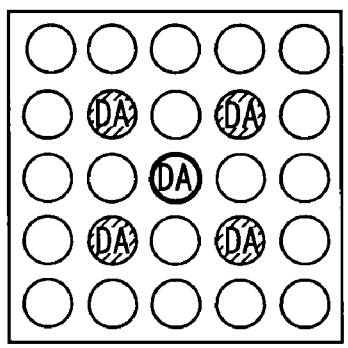
Figure 24D:
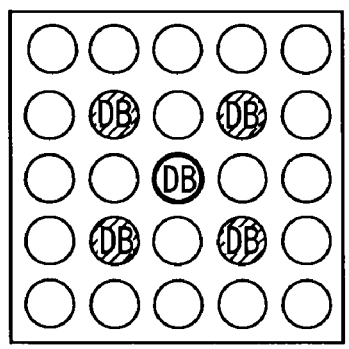
Figure 24E:
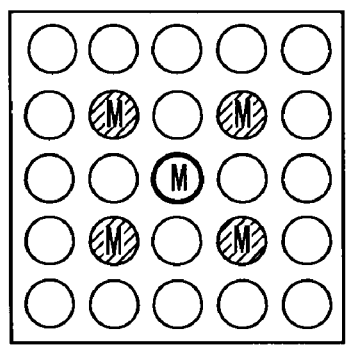
Figure 24F:
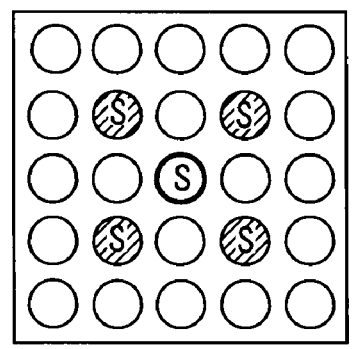

FIGS. 24A to 24F each show a case where four pixels around the specified pixel indicate the same correlation direction in Pattern T1. In this case, in the specified pixels in FIGS. 24A to 24D, interpolated are the vertical direction (V), the horizontal direction (H), the diagonal A direction (DA) and the diagonal B direction (DB), respectively, as the correlation direction. The specified pixels in FIGS. 24E and 24F are associated with omnidirectional correlation (M) and no correlation direction (S), respectively.

Figure 25A:
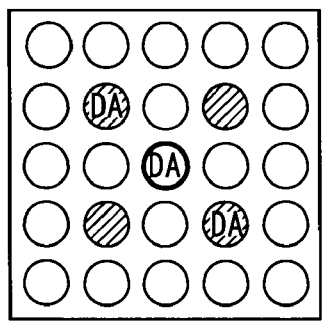
FIGS. 25A to 25C are views each showing the method of interpolating a correlation direction in Step 1.
Figure 25B:
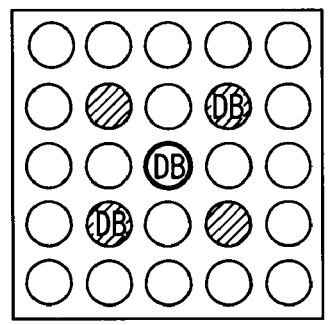
Figure 25C:
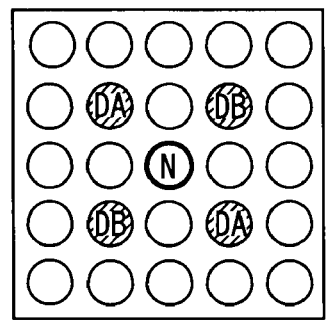

FIGS. 25A to 25C each show a case where two pixels around the specified pixel indicate the same correlation direction in Pattern T1. In this case, in the specified pixels in FIGS. 25A and 25B, interpolated are the diagonal A direction (DA) and the diagonal B direction (DB), respectively, as the correlation direction. In the case of FIG. 25C where the correlation direction of diagonal A direction and that of diagonal B direction are crossed over each other, however, the correlation direction of the specified pixel is not determined, remaining undetermined (N).

FIGS. 26A to 26D each show a case where three pixels around the specified pixel indicate the same correlation direction in Pattern T1. In this case, in each of the specified pixels in FIGS. 26A and 26B, interpolated is the diagonal A direction (DA) as the correlation direction. In each of the specified pixels in FIGS. 26C and 26D, interpolated is the diagonal B direction (DB) as the correlation direction.

FIGS. 27A to 27F each show a case where a plurality of pixels around the specified pixel indicate the same correlation direction in Pattern T2 or T3. Specifically, in a direction which the correlation direction of a pixel indicates, pixels having the same correlation direction exist.

Figure 27A:
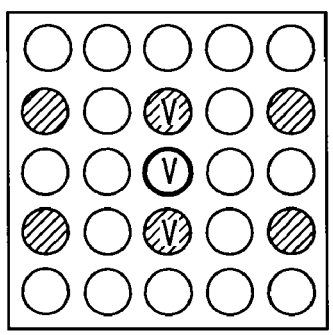
FIGS. 27A to 27F are views each showing the method of interpolating a correlation direction in Step 1.
Figure 27B:
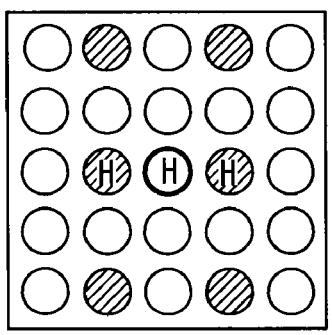
Figure 27C:
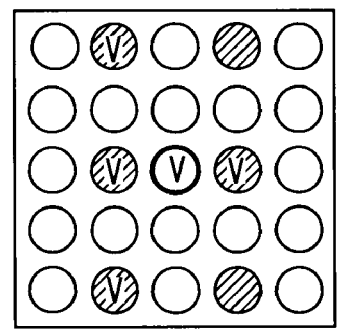
Figure 27D:
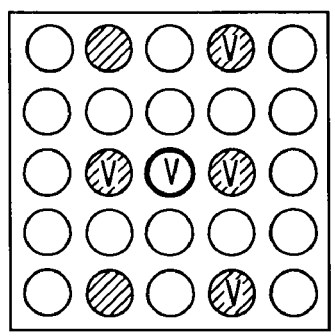
Figure 27E:
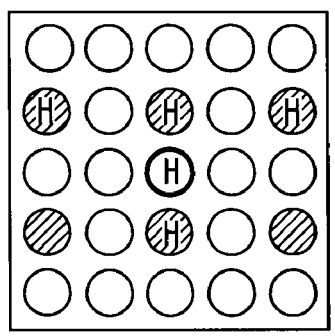
Figure 27F:
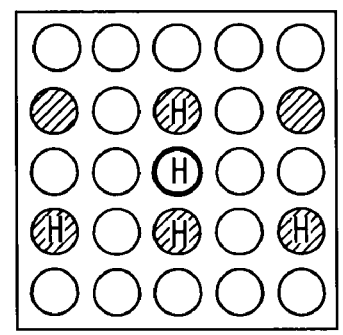

In this case, in each of the specified pixels of FIGS. 27A, 27C and 27D interpolated is the vertical direction (V) as the correlation direction. In each of the specified pixels of FIGS. 27B, 27E and 27F, interpolated is the horizontal direction (H) as the correlation direction.

The correlation direction interpolation circuit 38 performs Step 1 by using the methods of determining the correlation direction shown in FIGS. 24A-24F to 27A-27F. In Step 1, interpolation of the correlation directions is performed by using only the correlation directions determined by the first correlation judgment circuit 341.

<10-2. Step 2>

Subsequently, discussion will be made on Step 2. In Step 2, interpolation of the correlation directions is performed by also using the correlation directions interpolated in Step 1 besides the correlation directions determined by the first correlation judgment circuit 341.

Figure 28:
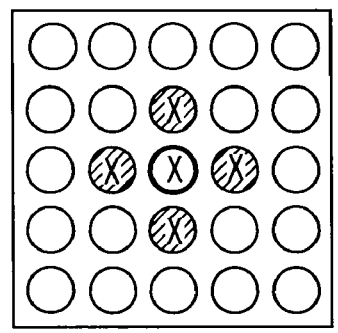
FIG. 28 is a view showing a method of interpolating a correlation direction in Step 2.
Figure 31A:
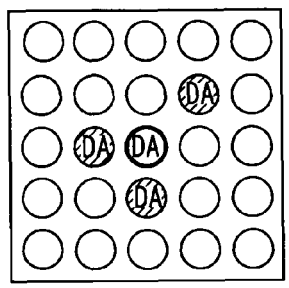
FIGS. 31A to 31F are views each showing the method of interpolating a correlation direction in Step 2.
Figure 31B:
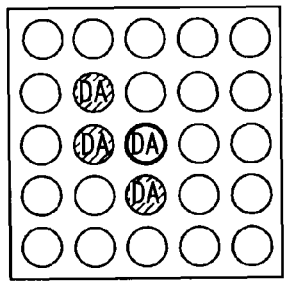
Figure 31C:
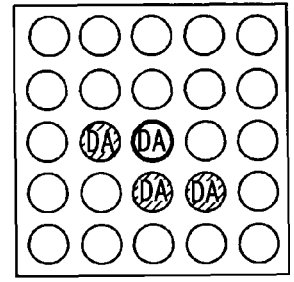
Figure 31D:
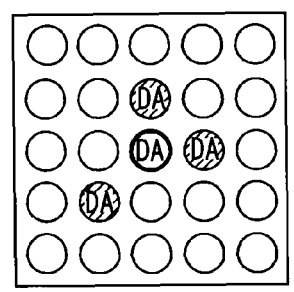
Figure 31E:
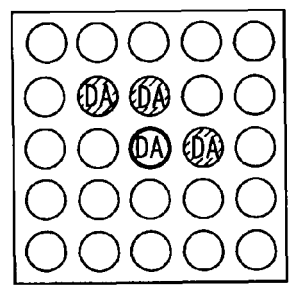
Figure 31F:
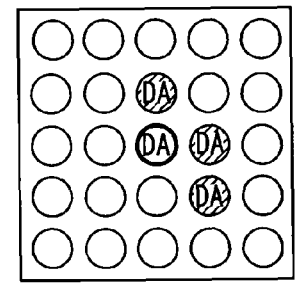
Figure 32A:
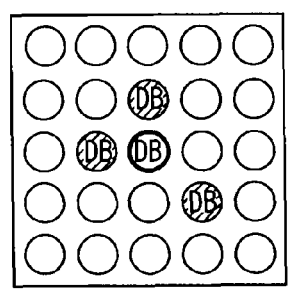
FIGS. 32A to 32F are views each showing the method of interpolating a correlation direction in Step 2.
Figure 32B:
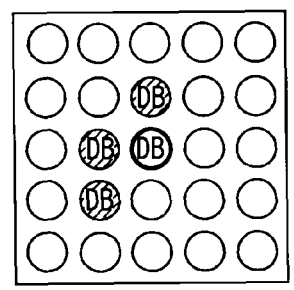
Figure 32C:
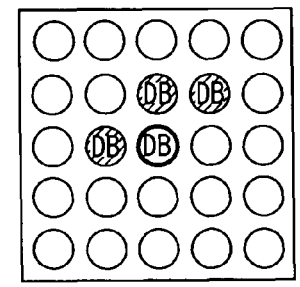
Figure 32D:
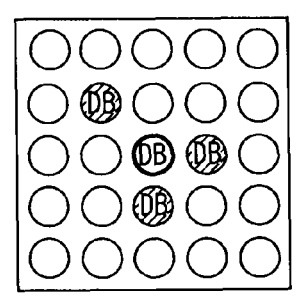
Figure 32E:
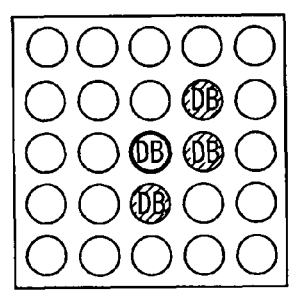
Figure 32F:
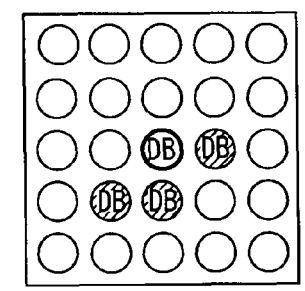
Figure 33A:
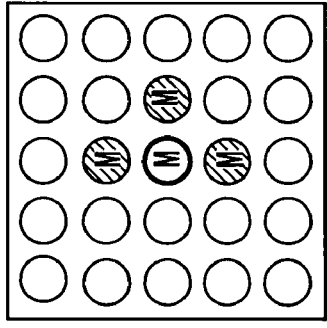
FIGS. 33A to 33D are views each showing the method of interpolating a correlation direction in Step 2.
Figure 33B:
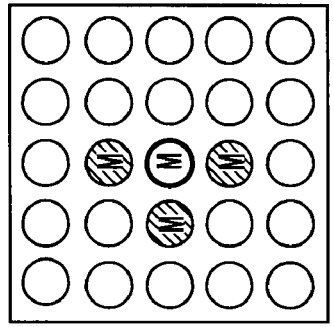
Figure 33C:
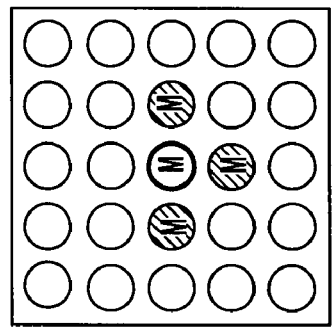
Figure 33D:
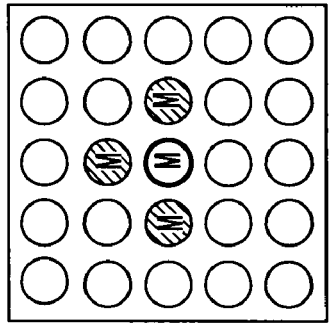

FIG. 28 shows a case where four pixels around the specified pixel, on the upper, lower, left and right sides, indicate the same correlation direction. In FIG. 28, the reference sign X indicates any one of V, H, DA, DB, M and S. In this case, in the specified pixel, interpolated is the same correlation direction as that of the surrounding four pixels, as the correlation direction.

FIGS. 29A to 29J each show a case where a plurality of pixels in an area adjacent to the specified pixel indicate the same correlation direction. In each of the specified pixels of FIGS. 29A, 29B, 29C, 29D, 29E, 29F, 29G 29H, 29I and 29J, interpolated is the vertical direction (V) as the correlation direction.

Also FIGS. 30A to 30J each show a case where a plurality of pixels in an area adjacent to the specified pixel indicate the same correlation direction. In each of the specified pixels of FIGS. 30A, 30B, 30C, 30D, 30E, 30F, 30G, 30H, 30I and 30J, interpolated is the horizontal direction (H) as the correlation direction.

Also FIGS. 31A to 31F each show a case where a plurality of pixels in an area adjacent to the specified pixel indicate the same correlation direction. In each of the specified pixels of FIGS. 31A, 31B, 31C, 31D, 31E and 31F, interpolated is the diagonal A direction (DA) as the correlation direction.

Also FIGS. 32A to 32F each show a case where a plurality of pixels in an area adjacent to the specified pixel indicate the same correlation direction. In each of the specified pixels of FIGS. 32A, 32B, 32C, 32D, 32E and 32F, interpolated is the diagonal B direction (DB) as the correlation direction.

Also FIGS. 33A to 33D each show a case where a plurality of pixels in an area adjacent to the specified pixel indicate the same correlation direction. The specified pixels of FIGS. 33A, 33B, 33C and 33D are each associated with omnidirectional correlation (M) as the correlation direction.

<10-3. Final Decision Step>

Figure 34:
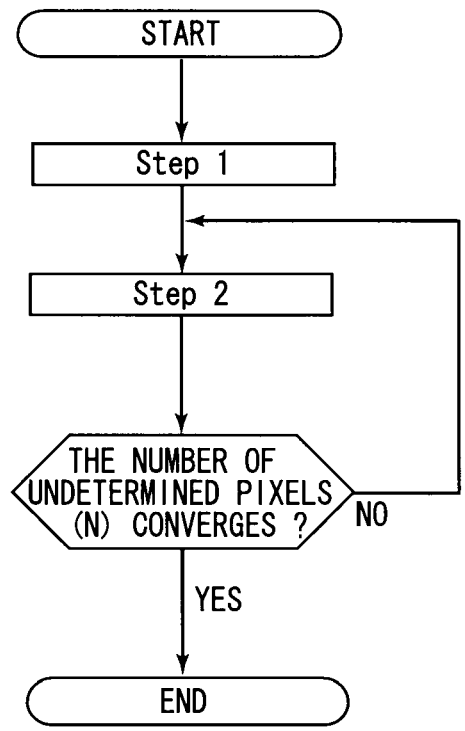
FIG. 34 is a flowchart of interpolation of correlation directions in accordance with a first preferred embodiment.

By executing above Steps 1 and 2, the correlation directions are interpolated. At the point of time when Step 2 is completed, as shown in FIG. 34, the number of undetermined pixels (N) whose correlation directions are not determined is calculated. Further, Step 2 is repeatedly executed. Then, at the point of time when the number of undetermined pixels (N) whose correlation directions are not determined converges, the interpolation of the correlation directions is completed. Finally, with respect to each of the undetermined pixels (N) whose correlation directions are not determined, information indicating that this is an undetermined pixel (N) is held.

Though the end condition of the interpolation process is convergence of the number of undetermined pixels (N) in the first preferred embodiment, the end condition may be that the number of undetermined pixels (N) becomes less than a predetermined threshold value. Alternatively, the end condition may be that the ratio of the undetermined pixels (N) to all the pixels becomes less than a predetermined threshold value.

<11. Filtering Process>

After determination of the correlation directions for the enlarged pixels, the correlation direction interpolation circuit 38 outputs information on the correlation directions of all the pixels to the filter 39. Specifically, all the pixels of the enlarged image are associated with information of any one of "V", "H", "DA", "DB", "M", "S" and The filter 39 further receives the judgment correlation values Cv, Ch, $Cd_A$ and $Cd_B$ selected with respect to each pixel from the selection circuit 33. Since the interpolated pixel for enlargement does not have the judgment correlation values Cv, Ch, $Cd_A$ and $Cd_B$, however, the judgment correlation values are acquired by linear interpolation with the surrounding pixel used. Alternatively, the judgment correlation values may be interpolated by using another algorithm.

The filter 39 determines a filter factor in accordance with the judgment correlation values in four directions with respect to the specified pixel to be processed and the correlation direction inputted from the correlation direction interpolation circuit 38 and sets the filter factor to each tap. The filter 39 is formed of a single filter circuit and serves as a filter having different characteristics, being switched by rewriting the filter factor in real time.

The filtering process discussed below is performed commonly on the pixel signals Y, Cb and Cr.

(When Judged that Specified Pixel Exists on Edge in Vertical Direction)

If the correlation direction of the specified pixel is the vertical direction (V) and the correlation of the specified pixel is small in any other direction, the specified pixel is judged to be a pixel existing on an edge in the vertical direction. The case where the correlation of the specified pixel in any other direction is small refers to a case where the correlation values (Ch, $Cd_A$, $Cd_B$) in the horizontal direction, diagonal A direction and diagonal B direction are larger than a predetermined threshold value. In other words, if the correlation in the vertical direction is high and that in any other direction is small, the specified pixel is judged to exist on an edge in the vertical direction. It is assumed, for example, that the specified pixel exists on a boundary of a line in the vertical direction, and so on.

Figure 35:
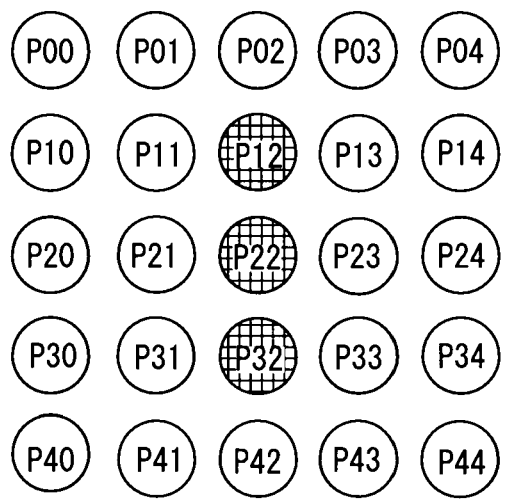
FIG. 35 is a view showing object pixels for filtering.

In this case, the noise removal process using three pixels in the vertical direction is performed on the specified pixel as shown in FIG. 35. Specifically, the filter 39 performs a filtering operation expressed by Eq. 44.

$$Q22=(P12+2*P22+P32)/4 \tag{Eq.44}$$

Further, the filter 39 performs an edge enhancement operation expressed by Eq. 45. In Eq. 45, (P21+P23−2*P22) is a Laplacian component, and by subtracting this component from the original signal, an edge component is enhanced. Further, in Eq. 45, k is a real number not smaller than 0 and not larger than 1, serving as a factor to adjust the degree of edge enhancement. The larger k is, the more the edge component is enhanced.

$$R22=P22-(P21+P23-2*P22)*k \tag{Eq.45}$$

The filter 39 performs two types of filtering operations expressed by Eqs. 44 and 45, and there are possible two patterns for the combination of the two filtering operations such as expressed by Eq. 46 and Eq. 47.

$$Q22=(P12+2*P22+P32)/4$$

$$R22=Q22-(P21+P23-2*P22)*k \tag{Eq.46}$$

In Eq. 46, on one line in the vertical direction, the noise removal process is performed, and then the edge enhancement process is performed in the horizontal direction. Though the value of "2*P22" out of the Laplacian component is subtracted in this case, the value of "2*Q22" may be subtracted.

$$Q21=(P11+2*P21+P31)/4$$

$$Q22=(P12+2*P22+P32)/4$$

$$Q23=(P13+2*P23+P33)/4$$

$$R22=Q22-(Q21+Q23-2*Q22)*k \tag{Eq.47}$$

In Eq. 47, on three lines in the vertical direction, the noise removal process is performed. Specifically, the noise removal process is performed also on the lines adjacent to the line which is judged to be the edge. Then, the edge enhancement process is performed in the horizontal direction. Though the value of "2*Q22" out of the Laplacian component is subtracted in this case, the value of "2*P22" may be subtracted.

Thus, when the specified pixel is judged to exist on an edge in the vertical direction, since the noise removal process is performed by using the points on the line in the vertical direction, it is possible to perform noise removal on an edge area by using appropriate pixels. Then, since the edge enhancement process is performed after the noise removal using the appropriate pixels, it is possible to achieve a sharper image.

The same operation is performed also in a case where the specified pixel is judged to exist on an edge in the horizontal direction. After the noise removal process is performed on one line or three lines in the horizontal direction by using the pixels in the horizontal direction, the edge enhancement process is performed by using the pixels in the vertical direction.

(When Judged that Specified Pixel Exists on Edge in Diagonal a Direction)

If the correlation direction of the specified pixel is the diagonal A direction (DA) and the correlation of the specified pixel is small in any other direction, the specified pixel is judged to be a pixel existing on an edge in the diagonal A direction. The case where the correlation of the specified pixel in any other direction is small refers to a case where the correlation values (Cv, Ch, $Cd_B$) in the vertical direction, horizontal direction and diagonal B direction are larger than the predetermined threshold value. In other words, if the correlation in the diagonal A direction is high and that in any other direction is small, the specified pixel is judged to exist on an edge in the diagonal A direction. It is assumed, for example, that the specified pixel exists on a boundary of a line in the diagonal A direction, and so on.

Figure 36:
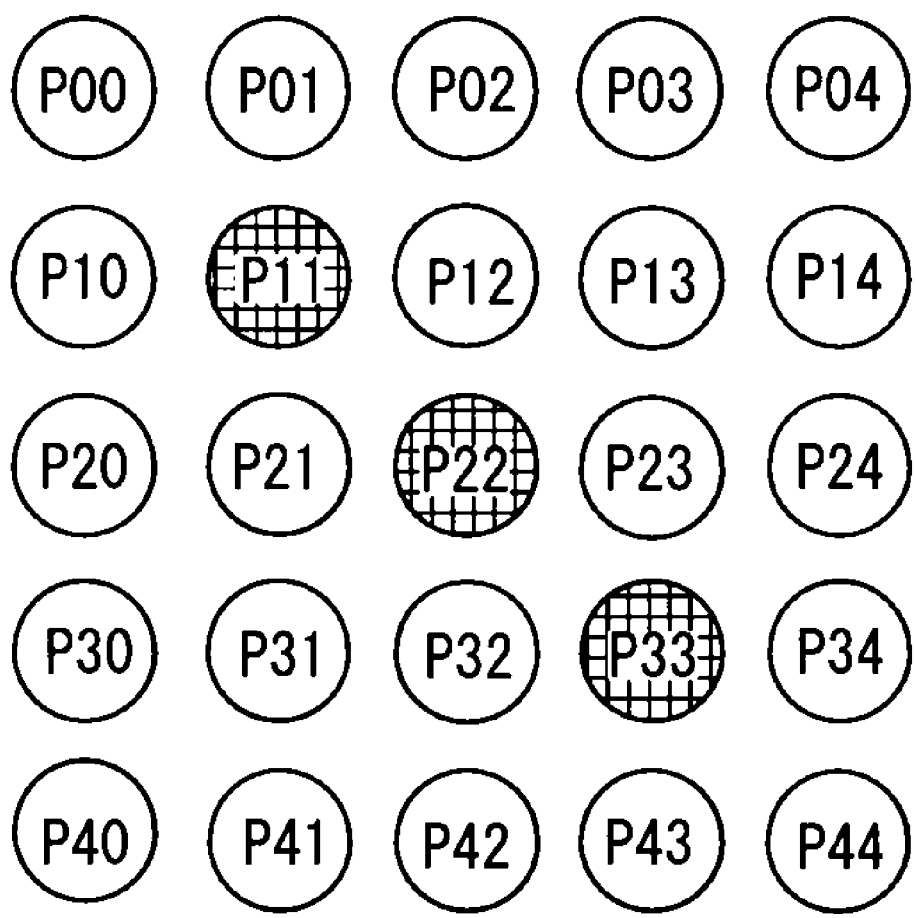
FIG. 36 is a view showing object pixels for filtering.

In this case, the noise removal process using three pixels in the diagonal A direction is performed on the specified pixel as shown in FIG. 36. Specifically, the filter 39 performs a filtering operation expressed by Eq. 48.

$$Q22=(P11+2*P22+P33)/4 \tag{Eq.48}$$

Further, the filter 39 performs an edge enhancement operation expressed by Eq. 49. In Eq. 49, (P13+P31−2*P22) is a Laplacian component. Further, in Eq. 49, k is a real number not smaller than 0 and not larger than 1, serving as a factor to adjust the degree of edge enhancement.

$$R22=P22-(P13+P31-2*P22)*k \tag{Eq.49}$$

The filter 39 performs two types of filtering operations expressed by Eqs. 48 and 49, and there are possible three patterns for the combination of the two filtering operations such as expressed by Eq. 50, Eq. 51 and Eq. 52.

$$Q22=(P11+2*P22+P33)/4$$

$$R22=Q22-(P13+P31-2*P22)*k \tag{Eq.50}$$

In Eq. 50, on one line in the diagonal A direction, the noise removal process is performed, and then the edge enhancement process is performed in the diagonal B direction. Though the value of "2*P22" out of the Laplacian component is subtracted in this case, the value of "2*Q22" may be subtracted.

$$Q_a=(P12+P23)/2$$

$$Q22=(P11+2*P22+P33)/4$$

$$Q_b=(P21+P32)/2$$

$$R22=Q22-(Q_a+Q_b-2*Q22)*k \tag{Eq.51}$$

In Eq. 51, on three lines in the diagonal A direction, the noise removal process is performed. Specifically, the noise removal process is performed also on the lines adjacent to the line which is judged to be the edge. Then, the edge enhancement process is performed in the diagonal B direction. Though the value of "2*Q22" out of the Laplacian component is subtracted in this case, the value of "2*P22" may be subtracted.

$$\begin{cases} Q13 = (P02 + 2*P13 + P24)/4 \\ Q22 = (P11 + 2*P22 + P33)/4 \\ Q31 = (P20 + 2*P31 + P42)/4 \\ R22 = Q22 - (Q13 + Q31 - 2*Q22)*k \end{cases} \tag{Eq. 52}$$

Also in Eq. 52, on three lines in the diagonal A direction, the noise removal process is performed. The filtering expressed by Eq. 52, however, uses pixels a little away from the specified pixel as compared with the filtering expressed by Eq. 51. Then, the edge enhancement process is performed in the diagonal B direction. Though the value of "2*Q22" out of the Laplacian component is subtracted in this case, the value of "2*P22" may be subtracted.

Thus, when the specified pixel is judged to exist on an edge in the diagonal A direction, since the noise removal process is performed by using the points on the line in the diagonal A direction, it is possible to perform noise removal on an edge area by using appropriate pixels. Then, since the edge enhancement process is performed by using the pixels in the diagonal B direction after the noise removal using the appropriate pixels, it is possible to achieve a sharper image.

The same operation is performed also in a case where the specified pixel is judged to exist on an edge in the diagonal B direction. After the noise removal process is performed on one line or three lines in the diagonal B direction by using the pixels in the diagonal B direction, the edge enhancement process is performed by using the pixels in the diagonal A direction.

(When Judged That Specified Pixel Is Undetermined Pixel (N) Whose Correlation Direction Is Undetermined)

With respect to the undetermined pixel (N) whose correlation direction is not determined by the correlation direction interpolation circuit 38, filtering expressed by Eq. 53 is performed. Specifically, a Laplacian component Lap in eight directions is calculated and the Laplacian component Lap is subtracted from the original pixel value. In Eq. 53, k is a positive coefficient.

$$Lap=(P11+P12+P13+P21+P23+P31+P32+P33)-8*P22$$

$$R22=P22-Lap*k \tag{Eq.53}$$

Alternatively, with respect to the undetermined pixel (N) whose correlation direction is not determined, filtering expressed by Eq. 54 is performed. The Laplacian component Lap in Eq. 54 is calculated by using pixels in a broader area.

$$Lap=(P00+P02+P04+P20+P24+P40+P42+P44)-8*P22$$

$$R22=P22-Lap*k \tag{Eq.54}$$

As discussed above, the image processing circuit 3 of the first preferred embodiment interpolates the correlation direction determined for pixel interpolation also with respect to the enlarged pixels. Therefore, when the filtering process is performed on an enlarged image, an appropriate filtering operation can be performed on the pixels generated by the enlargement process.

{The Second Preferred Embodiment}

Next, discussion will be made on the second preferred embodiment. The second preferred embodiment is different from the first preferred embodiment in the method of interpolating the correlation direction.

Figure 37:
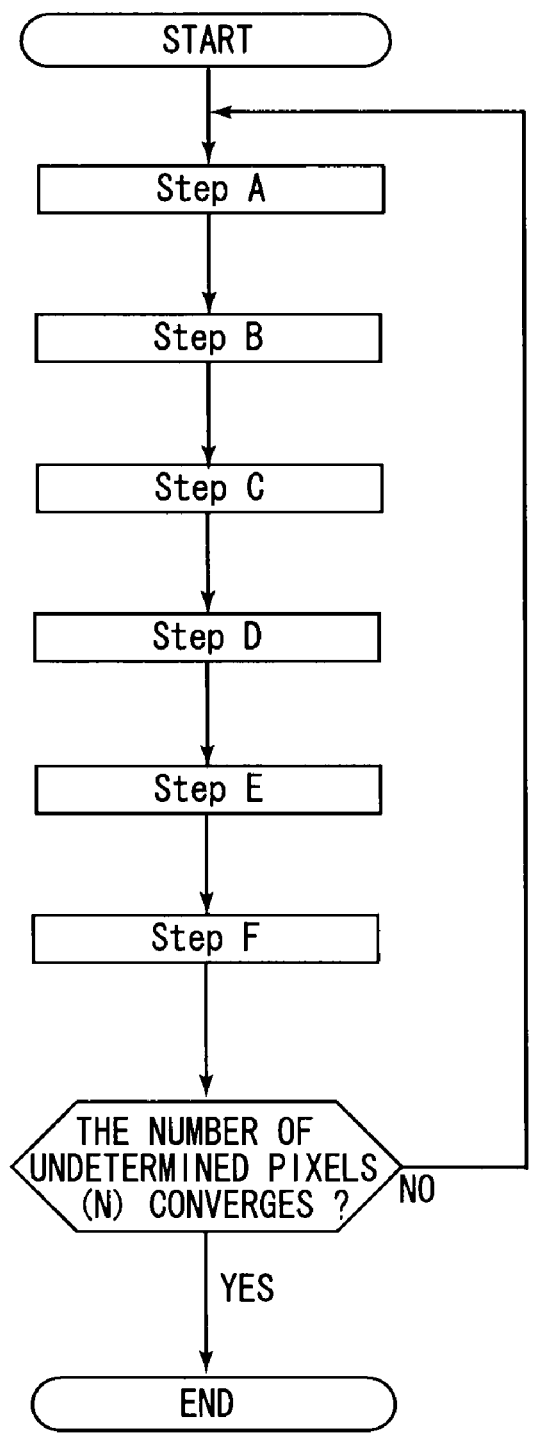
FIG. 37 is a flowchart of interpolation of a correlation direction in accordance with a second preferred embodiment.

FIG. 37 is a flowchart of interpolation of the correlation direction in accordance with the second preferred embodiment. Steps of determining the correlation direction, from Step A to Step F, are sequentially performed, and finally, the number of undetermined pixels (N) is checked. If the number of undetermined pixels (N) converges, this process is finished and if the number of undetermined pixels (N) does not converge, Steps A to F are further repeated.

In the first preferred embodiment shown in FIG. 34, after Step 1 is finished, Step 2 is executed by also using the correlation direction interpolated in Step 1. On the other hand, in the second preferred embodiment, while a series of operations from Step A to Step F are executed, the correlation direction interpolated in the antecedent step is not used in the following step. The correlation direction interpolated in a series of operations is used in the next series of operations.

<Step A>

In Step A, the same determination method as shown in FIGS. 24A to 24F in the first preferred embodiment is executed. In the case where the surrounding four pixels are associated with the same correlation direction, also in the specified pixel, interpolated is the same correlation direction as that of the surrounding four pixels.

<Step B>

In Step B, the same determination method as shown in FIG. 28 in the first preferred embodiment is executed. In the case where the surrounding four pixels, on the upper, lower, left and right sides, are associated with the same correlation direction, also in the specified pixel, interpolated is the same correlation direction as that of the surrounding four pixels.

<Step C>

In Step C, the same determination method as shown in FIGS. 25A-25C to 27A-27F in the first preferred embodiment is executed. In the case where a plurality of surrounding pixels are associated with the same correlation direction, also in the specified pixel, interpolated is the same correlation direction as that of the surrounding pixels.

<Step D>

In Step D, the same determination method as shown in FIGS. 29A-29J to 33A-33D in the first preferred embodiment is executed. In the case where a plurality of surrounding pixels adjacent to one another are associated with the same correlation direction, also in the specified pixel, interpolated is the same correlation direction as that of the surrounding pixels.

<Step E>

Figure 38D:
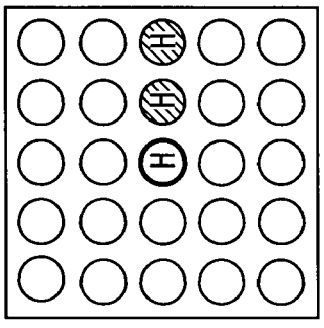
FIGS. 38A to 38H are views each showing a method of interpolating a correlation direction in Step E.
Figure 38H:
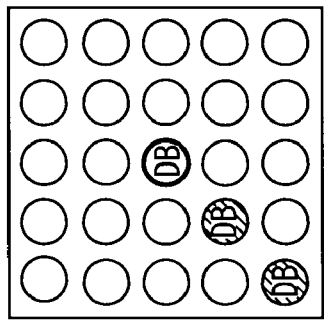
Figure 38C:
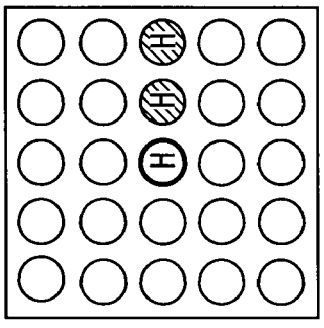
Figure 38G:
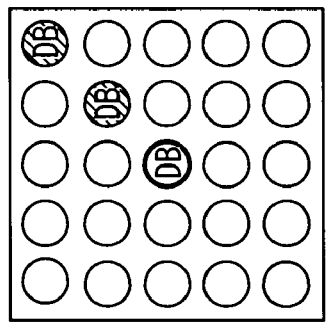
Figure 38B:
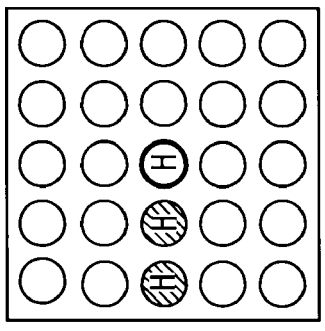
Figure 38F:
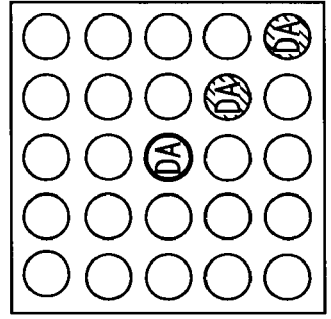
Figure 38A:
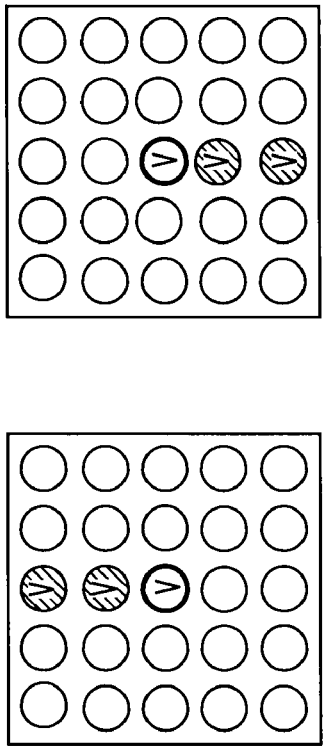
Figure 38E:
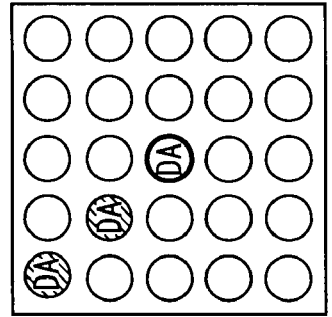
Figure 39A:
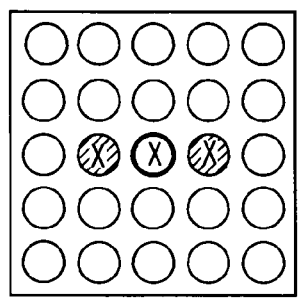
FIGS. 39A to 39L are views each showing a method of interpolating a correlation direction in Step F.
Figure 39B:
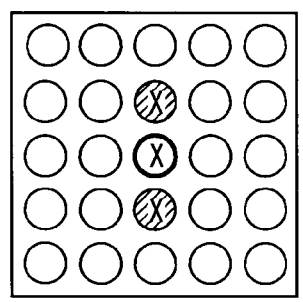
Figure 39C:
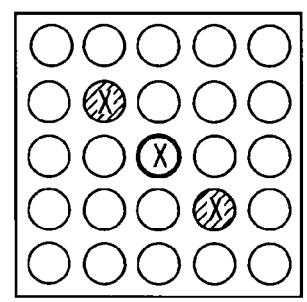
Figure 39D:
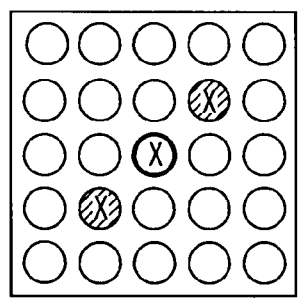
Figure 39E:
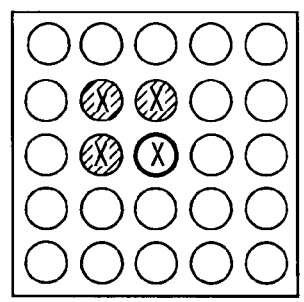
Figure 39F:
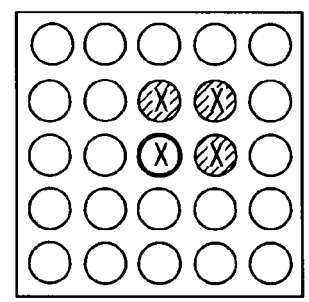
Figure 39G:
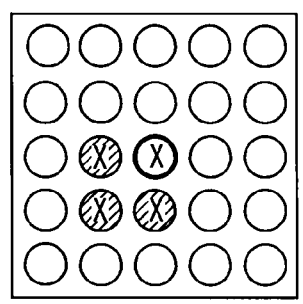
Figure 39H:
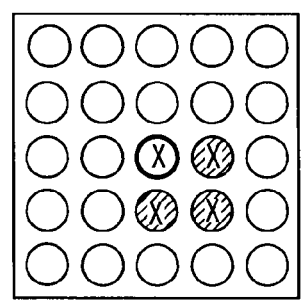
Figure 39I:
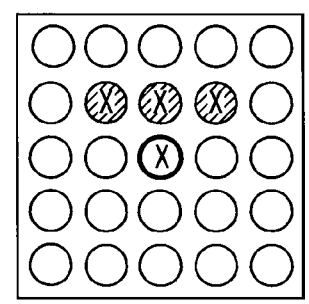
Figure 39J:
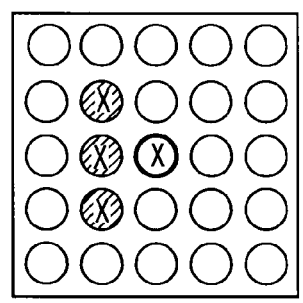
Figure 39K:
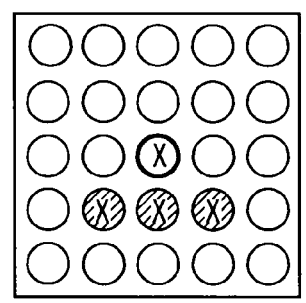
Figure 39L:
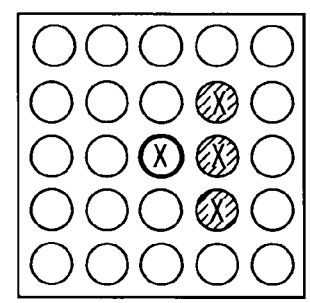

In Step E, a determination method which is not used in the first preferred embodiment is executed. The determination method is shown in FIGS. 38A to 38H. As shown in FIGS. 38A and 38B, in the case where pixels which are serially associated with the correlation direction of the vertical direction exist on only one of the upper and lower sides, also in the specified pixel, interpolated is the vertical direction (V). As shown in FIGS. 38C and 38D, in the case where pixels which are serially associated with the correlation direction of the horizontal direction exist on only one of the left and right sides, also in the specified pixel, interpolated is the horizontal direction (H). As shown in FIGS. 38E and 38F, in the case where pixels which are serially associated with the correlation direction of the diagonal A direction exist on only one side of the diagonal A direction, also in the specified pixel, interpolated is the diagonal A direction (DA). As shown in FIGS. 38G and 38H, in the case where pixels which are serially associated with the correlation direction of the diagonal B direction exist on only one side of the diagonal B direction, also in the specified pixel, interpolated is the diagonal B direction (DB).

Thus, in Step E, the correlation direction is interpolated on the basis of the condition of part of the area around the specified pixel, such as one of the upper and lower sides, one of the left and right sides or the like. Therefore, in Step E, as compared with the first preferred embodiment, the correlation direction of the specified pixel is interpolated by a milder evaluation method.

<Step F>

In Step F, a determination method which is not used in the first preferred embodiment is executed. The determination method is shown in FIGS. 39A to 39I. As shown in FIGS. 39A to 39D, in the case where two pixels sandwiching the specified pixel in any one of the horizontal direction, vertical direction, diagonal A direction and diagonal B direction have the same correlation direction, also in the specified pixel, interpolated is the same correlation direction as that of the sandwiching pixels.

As shown in FIGS. 39E to 39H, in a pixel area of 2×2 consisting of adjacent pixels including the specified pixel, if the three pixels other than the specified pixel have the same correlation direction, also in the specified pixel, interpolated is the same correlation direction as that of the other three pixels.

As shown in FIGS. 39I to 39L, in the case where three serial pixels in one of the upper, lower, left and right directions have the same correlation direction, also in the specified pixel, interpolated is the same correlation direction as that of the other three pixels.

In the twelve patterns of FIGS. 39A to 39L, the cross-hatched pixels have only to have the same correlation direction, regardless of the type of correlation direction. Thus, also in Step F, as compared with the first preferred embodiment, the correlation direction of the specified pixel is interpolated by a milder evaluation method.

<Final Step>

After a series of operations for determining the correlation direction, from Step A to Step F, the number of undetermined pixels (N) is checked. Then, if the number of undetermined pixels (N) does not converge, again from Step A, next one series of operations for determining the correlation direction are executed. In this time, Steps A to F are executed by also using the correlation directions interpolated in the antecedent operation. When the number of undetermined pixels (N) converges, this process is finished.

Though the end condition of the interpolation process is convergence of the number of undetermined pixels (N) also in the second preferred embodiment, the end condition may be that the number of undetermined pixels (N) becomes less than a predetermined threshold value. Alternatively, the end condition may be that the ratio of the undetermined pixels (N) to all the pixels becomes less than a predetermined threshold value.

After the interpolation of the correlation direction is completed by the above process, like in the first preferred embodiment, the filter 39 performs a filtering process in consideration of the correlation direction. In the process for interpolating the correlation direction in the second preferred embodiment, the correlation direction is interpolated through a relatively mild evaluation. Therefore, this is a method intended to suppress generation of the undetermined pixels (N) as low as possible.

Further, in the second preferred embodiment, until one series of operations from Step A to Step F is finished, the correlation direction interpolated in the antecedent step is not used in any one of the following steps. In the first series of operations, for example, the correlation direction is interpolated by using only the correlation direction determined by the first correlation judgment circuit 341. Therefore, particularly in the first series of operations, interpolation can be performed by using the correlation directions with high precision. In order to increase the speed of reducing the number of undetermined pixels (N), however, also in the second preferred embodiment, the correlation direction interpolated in the antecedent step may be used in the following step.

{The Third Preferred Embodiment}

Figure 40:
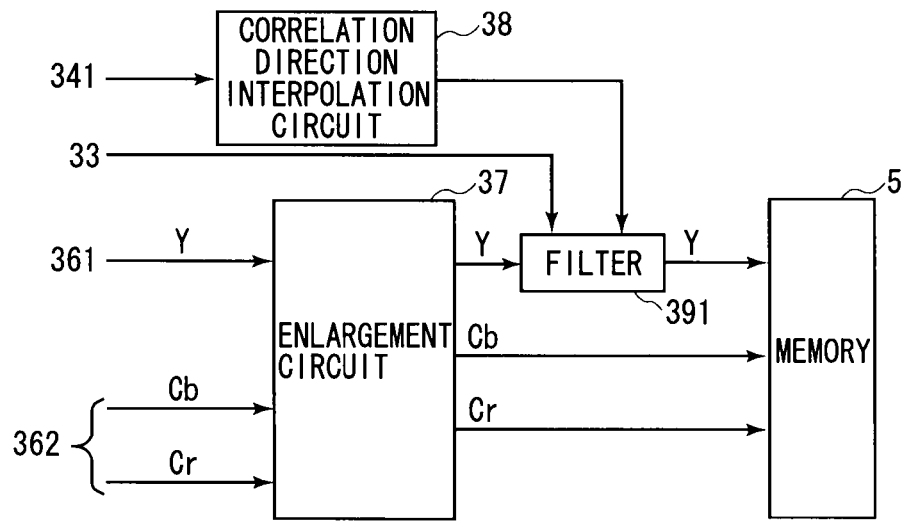
FIG. 40 is a block diagram showing an image processing circuit in accordance with a third preferred embodiment.

Next, discussion will be made on the third preferred embodiment of the present invention. FIG. 40 is a block diagram showing part of an image processing circuit 3 in accordance with the third preferred embodiment. The image processing circuit 3 of the third preferred embodiment is different from the image processing circuit 3 shown in FIG. 1 in the constitution of the filter.

As shown in FIG. 40, a filter 39I receives only a luminance signal (Y signal) outputted from the enlargement circuit 37. The filter 39I performs a filtering process on the luminance signal on the basis of the correlation direction received from the correlation direction interpolation circuit 38 and the correlation values of the four directions received from the selection circuit 33. The operation of the filtering process is the same as that in the first preferred embodiment. The luminance signal is edge-enhanced after having been subjected to the noise removal process.

Thus, in the third preferred embodiment, performed is the filtering process in consideration of the correlation directions only on the luminance signal having strong influence on the definition of the image. The third preferred embodiment can reduce the circuit scale of the filter, as compared with the first preferred embodiment.

{The Fourth Preferred Embodiment}

Figure 41:
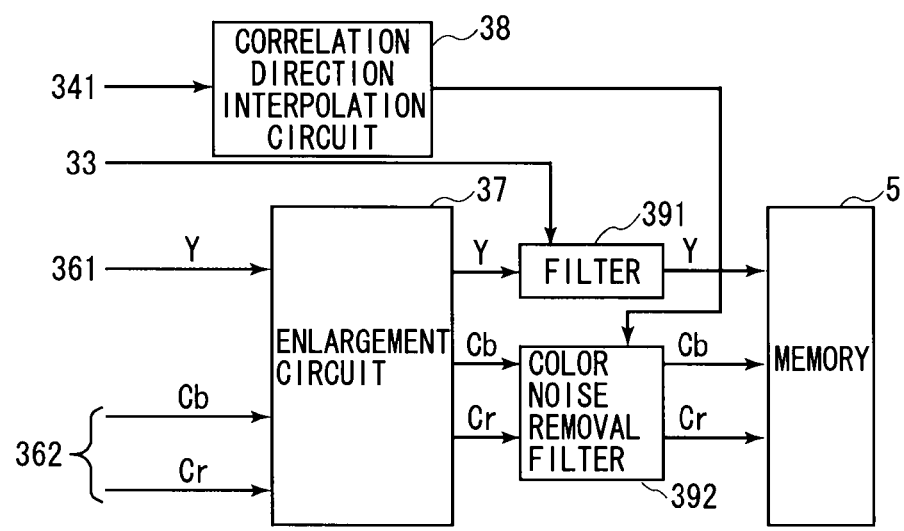
FIG. 41 is a block diagram showing an image processing circuit in accordance with a fourth preferred embodiment.

Next, discussion will be made on the fourth preferred embodiment of the present invention. FIG. 41 is a block diagram showing part of an image processing circuit 3 in accordance with the fourth preferred embodiment. The image processing circuit 3 of the fourth preferred embodiment is different from the image processing circuit 3 shown in FIG. 1 in the constitution of the filter.

As shown in FIG. 41, the filter 39I receives only the luminance signal (Y signal) outputted from the enlargement circuit 37. The operation of the filter 39I is the same as that in the third preferred embodiment.

A color noise removal filter 392 receives color difference signals (Cr signal, Cb signal) outputted from the enlargement circuit 37. The color noise removal filter 392 performs a process of removing the noise in the color difference component in consideration of the correlation direction inputted by the correlation direction interpolation circuit 38.

Thus, in the fourth preferred embodiment, the edge enhancement process in consideration of the correlation directions is performed on the luminance signal having strong influence on the definition of the image and further the noise removal process in consideration of the correlation directions is performed on the color difference component. It is thereby possible to improve the definition of the image and suppress the color noise.

{The Fifth Preferred Embodiment}

In the first and second preferred embodiments, the correlation direction interpolation circuit 38 discriminates between the omnidirectional correlation (M) and no correlation direction (S) in processing. In the fifth preferred embodiment, the omnidirectional correlation (M) and no correlation direction (S) are not discriminated from each other and these are dealt with as the same correlation type. This simplifies the processing and ensures improvement in processing speed and reduction in circuit scale.

The Sixth Preferred Embodiment

Figure 42:
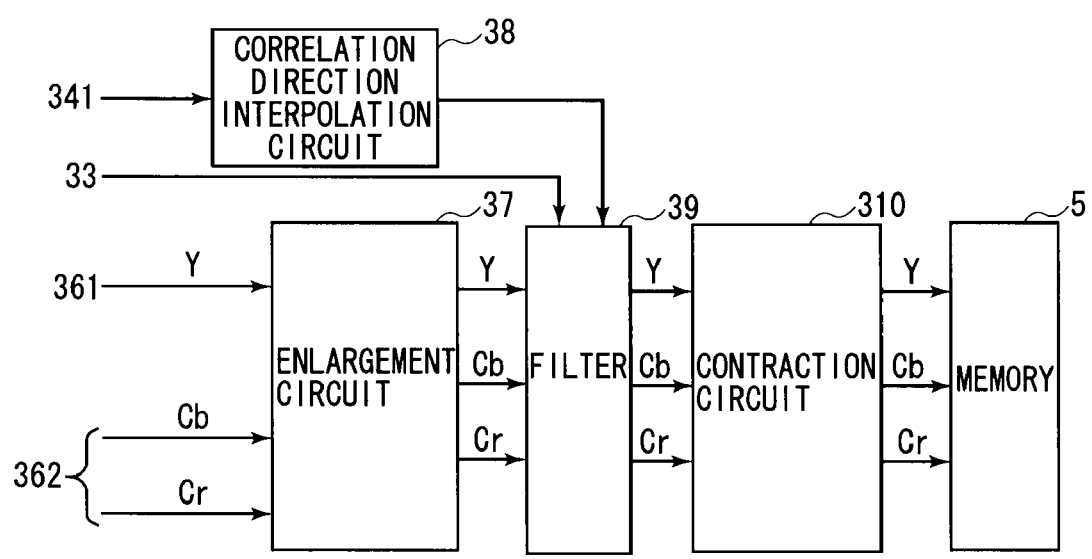
FIG. 42 is a block diagram showing an image processing circuit in accordance with a sixth preferred embodiment.

Next, discussion will be made on the sixth preferred embodiment of the present invention. FIG. 42 is a block diagram showing part of an image processing circuit 3 in accordance with the sixth preferred embodiment. The image processing circuit 3 of the sixth preferred embodiment is different from the image processing circuit 3 shown in FIG. 1 in that a contraction circuit 310 is provided in a post stage of the filter 39.

The contraction circuit 310 contracts an enlarged image after having been subjected to the filtering process in the filter 39. For example, an image enlarged to twice the size by the enlargement circuit 37 is contracted to half the size, to generate an image as large as the original image. While the size of the image is enlarged and then contracted, the filtering process is performed by using the enlarged and interpolated correlation direction. Thus, an image having quality better than that of the original RGB image can be achieved.

While the invention has been shown and described in detail, the foregoing description is in all aspects illustrative and not restrictive. It is therefore understood that numerous modifications and variations can be devised without departing from the scope of the invention.

What is claimed is:

1. An image enlargement method, comprising:

a) an input step of inputting a pixel signal of a predetermined color space, which has one color component per pixel;

b) a correlation direction calculation step of obtaining a correlation direction of each pixel;

c) a color component interpolation step of interpolating a signal of other color component in said predetermined color space for each pixel by using pixels relating to said correlation direction;

d) an image enlargement step of generating an enlarged image by interpolating a pixel signal for enlargement;

e) a correlation direction interpolation step of interpolating said correlation direction on each pixel generated by interpolation for enlargement by using said correlation direction obtained in said correlation direction calculation step b); and f) a filtering step of performing a filtering process on a pixel existing before execution of said image enlargement step d) in consideration of said correlation direction obtained in said correlation direction calculation step b) or on a pixel generated in said image enlargement step d) in consideration of said correlation direction interpolated in said correlation direction interpolation step e).

2. The image enlargement method according to claim 1, wherein
said correlation direction interpolation step e) includes
e-1) a first step of specifying an object pixel out of pixels generated in said image enlargement step d) and associating said object pixel with the same correlation direction as that of surrounding pixels as the correlation direction of said object pixel if the arrangement of pixels with which the same correlation direction is associated, among said surrounding pixels of said object pixel, matches a predetermined rule; and
e-2) a second step of judging whether or not the number of pixels whose correlation directions are not determined in said first step e-1) satisfies a predetermined criterion, and
said first step e-1) is repeatedly executed until the number of pixels is judged to satisfy the predetermined criterion in said second step e-2).

3. The image enlargement method according to claim 1, wherein
said correlation direction interpolation step e) includes
e-1) a first step of specifying an object pixel out of pixels generated in said image enlargement step d) and associating said object pixel with the same correlation direction as that of surrounding pixels as the correlation direction of said object pixel if the arrangement of pixels with which the same correlation direction is associated, among said surrounding pixels of said object pixel, matches a first rule;
e-2) a second step of specifying a remaining pixel out of the pixels with which no correlation direction is associated in said first step e-1) and associating said remaining pixel with the same correlation direction as that of surrounding pixels as the correlation direction of said remaining pixel if the arrangement of pixels with which the same correlation direction is associated, which include said pixel with which said correlation direction is associated in said first step e-1), matches a second rule; and
e-3) a third step of judging whether or not the number of pixels whose correlation directions are not determined in said first step e-1) and said second step e-2) satisfies a predetermined criterion, and
said first step e-1) and said second step e-2) are repeatedly executed until the number of pixels is judged to satisfy the predetermined criterion in said third step e-3).

4. The image enlargement method according to claim 1, wherein
said filtering step f) includes the steps of:
performing a noise removal process on a direction along said correlation direction; and
performing an edge enhancement process on a direction orthogonal to said correlation direction.

5. The image enlargement method according to claim 1, wherein
a filtering process is performed only on a luminance signal in said enlarged image in said filtering step f).

6. The image enlargement method according to claim 1, wherein
a noise removal process is performed on a color difference signal in said enlarged image in said filtering step f).

7. The image enlargement method according to claim 1, wherein
an image is enlarged twice in the horizontal direction and the vertical direction in said image enlargement step d), and said correlation direction obtained in said correlation direction calculation step b) is interpolated twice in said horizontal direction and said vertical direction for enlargement in said correlation direction interpolation step e).

8. The image enlargement method according to claim 1, further comprising
g) an image contraction step of contracting said enlarged image having been subjected to said filtering process in said filtering step f).

* * * * *